(12) United States Patent
Dugat

(10) Patent No.: US 10,843,876 B2
(45) Date of Patent: Nov. 24, 2020

(54) HYBRID DIVERTER WITH MULTI-ACTION TRANSFER BAR AND METHOD OF USING SAME

(71) Applicant: Robotica, Inc., Cypress, TX (US)

(72) Inventor: Jay Mark Dugat, Cypress, TX (US)

(73) Assignee: Robotica, Inc., Cypress, TX (US)

( * ) Notice: Subject to any disclaimer, the term of this patent is extended or adjusted under 35 U.S.C. 154(b) by 0 days.

(21) Appl. No.: 16/552,829

(22) Filed: Aug. 27, 2019

(65) Prior Publication Data

US 2020/0062514 A1 Feb. 27, 2020

Related U.S. Application Data

(60) Provisional application No. 62/723,353, filed on Aug. 27, 2018.

(51) Int. Cl.
| | |
|---|---|
| *B65G 47/54* | (2006.01) |
| *B65G 13/10* | (2006.01) |
| *B65G 47/82* | (2006.01) |
| *B65G 47/76* | (2006.01) |

(52) U.S. Cl.
CPC ............. *B65G 47/54* (2013.01); *B65G 13/10* (2013.01); *B65G 47/766* (2013.01); *B65G 47/82* (2013.01)

(58) Field of Classification Search
CPC ...... B65G 13/10; B65G 47/54; B65G 47/766; B65G 47/82
See application file for complete search history.

(56) References Cited

U.S. PATENT DOCUMENTS

| | | |
|---|---|---|
| 1,603,633 A | 10/1926 | Nelson |
| 1,737,762 A | 12/1929 | Howe |
| 2,590,359 A | 3/1952 | Zopf |
| 2,993,583 A | 7/1961 | Sykes |
| 3,104,004 A | 9/1963 | Poel et al. |

(Continued)

FOREIGN PATENT DOCUMENTS

| | | |
|---|---|---|
| CN | 102079407 A | 6/2011 |
| DE | 2259273 C2 | 8/1984 |

OTHER PUBLICATIONS

PCT/US2014/025098 International Search Report and Written Opinion dated Sep. 15, 2014, 11 pages.

(Continued)

*Primary Examiner* — Gene O Crawford
*Assistant Examiner* — Keith R Campbell
(74) *Attorney, Agent, or Firm* — JL Salazar

(57) ABSTRACT

A hybrid diverter includes a base and a transfer assembly. The base includes a base frame and base rollers rotationally supported on the base frame to define a base path for passing the items therealong. The transfer assembly includes a transfer drive and a transfer bar. The transfer drive includes first and second independent drive tracks. The transfer bar has a fixed end connected to the first independent drive track and a slotted end movably connectable to the second independent drive track. The transfer bar is movable by the first and the second independent drive tracks along a variable transfer path about the base. The transfer bar has a surface for engagement with the items whereby, upon activation of the first independent drive track and the second independent drive track, the transfer bar selectively diverts the items away from the conveyor path.

20 Claims, 16 Drawing Sheets

(56) References Cited

U.S. PATENT DOCUMENTS

| | | | |
|---|---|---|---|
| 3,137,068 A | 6/1964 | Quigley | |
| 3,232,409 A | 2/1966 | Pierson et al. | |
| 3,606,058 A | 9/1971 | Davis | |
| 3,944,054 A | 3/1976 | Ensinger | |
| 4,014,428 A | 3/1977 | Ossbahr | |
| 4,187,755 A | 2/1980 | Shirai | |
| 4,192,496 A | 3/1980 | Baselice et al. | |
| 4,200,178 A | 4/1980 | Gunti | |
| 4,256,213 A | 3/1981 | Shaw et al. | |
| 4,269,302 A | 5/1981 | Garvey | |
| 4,629,302 A | 12/1986 | Willcox | |
| 4,653,961 A | 3/1987 | Hashimoto | |
| 4,715,488 A | 12/1987 | Hewitt et al. | |
| 4,730,718 A | 3/1988 | Fazio et al. | |
| 4,804,081 A | 2/1989 | Lenhardt | |
| 4,962,841 A | 10/1990 | Kloosterhouse | |
| 5,033,348 A | 7/1991 | Walsh | |
| 5,101,703 A | 4/1992 | Tanaka et al. | |
| 5,150,781 A | 9/1992 | Deisenroth et al. | |
| 5,165,516 A | 11/1992 | Reed et al. | |
| 5,172,804 A | 12/1992 | Chersin | |
| 5,217,110 A | 6/1993 | Spangler et al. | |
| 5,351,809 A | 10/1994 | Gilmore et al. | |
| 5,400,895 A * | 3/1995 | Hollingsworth | B65G 47/50 |
| | | | 198/367 |
| 5,456,348 A | 10/1995 | Whetsel et al. | |
| 5,568,857 A | 10/1996 | Chen et al. | |
| 5,699,892 A | 12/1997 | Shyr et al. | |
| 5,718,325 A | 2/1998 | Doster et al. | |
| 5,725,349 A | 3/1998 | Garvey et al. | |
| 5,854,460 A | 12/1998 | Graf et al. | |
| 5,911,300 A | 6/1999 | Mraz | |
| 5,971,132 A * | 10/1999 | Bonnet | B65G 47/54 |
| | | | 198/370.07 |
| 5,984,078 A | 11/1999 | Bonnet | |
| 6,068,111 A | 5/2000 | Smith et al. | |
| 6,073,747 A | 6/2000 | Takino et al. | |
| 6,220,421 B1 * | 4/2001 | Hugon | B65G 47/82 |
| | | | 198/370.07 |
| 6,227,377 B1 | 5/2001 | Bonnet | |
| 6,264,042 B1 | 7/2001 | Cossey et al. | |
| 6,471,031 B1 | 10/2002 | Duncalf | |
| 6,516,937 B1 * | 2/2003 | Deer | B65G 43/00 |
| | | | 198/370.07 |
| 6,533,096 B2 | 3/2003 | Gilmore et al. | |
| 6,536,580 B1 * | 3/2003 | Fritzsche | B65G 47/766 |
| | | | 198/370.07 |
| 6,595,349 B2 | 7/2003 | MacSwan | |
| 6,629,018 B2 | 9/2003 | Mondie et al. | |
| 6,719,119 B1 | 4/2004 | Hendzel et al. | |
| 6,782,993 B2 | 8/2004 | Bernard et al. | |
| 6,843,365 B2 | 1/2005 | Baker | |
| 6,907,978 B2 | 6/2005 | Evans et al. | |
| 6,957,736 B2 | 10/2005 | Bonifer et al. | |
| 7,147,097 B2 * | 12/2006 | Lemm | B65G 47/766 |
| | | | 198/370.01 |
| 7,150,383 B2 | 12/2006 | Talken | |
| 7,174,695 B2 | 2/2007 | Porter et al. | |
| 7,261,198 B2 | 8/2007 | Tatar et al. | |
| 7,638,729 B2 | 12/2009 | Park | |
| 7,641,043 B2 | 1/2010 | Vestergaard | |
| 7,690,497 B2 * | 4/2010 | Radwallner | B65G 47/82 |
| | | | 198/440 |
| 7,720,567 B2 | 5/2010 | Doke et al. | |
| 7,909,153 B2 | 3/2011 | Pogue | |
| 8,161,854 B2 | 4/2012 | Fourney | |
| 8,561,790 B2 | 10/2013 | Brayman et al. | |
| 8,684,169 B2 | 4/2014 | Itoh et al. | |
| 8,827,623 B2 | 9/2014 | Stelter et al. | |
| 9,110,773 B2 | 8/2015 | Roush | |
| 9,216,862 B2 | 12/2015 | Wallace | |
| 9,334,111 B2 * | 5/2016 | Hoynash | B65G 1/04 |
| 9,475,653 B2 | 10/2016 | Dugat | |
| 9,926,094 B2 | 3/2018 | Dugat | |
| 9,981,810 B2 | 5/2018 | Dugat | |
| 9,988,218 B2 | 6/2018 | Dugat et al. | |
| 10,232,409 B2 | 3/2019 | Dugat | |
| 2001/0003939 A1 | 6/2001 | Liu et al. | |
| 2004/0211651 A1 | 10/2004 | Hall | |
| 2004/0226803 A1 | 11/2004 | Brixius et al. | |
| 2007/0051585 A1 * | 3/2007 | Scott | B65G 47/54 |
| | | | 198/370.07 |
| 2007/0125212 A1 | 6/2007 | Hilgendorf | |
| 2007/0162174 A1 | 7/2007 | Doke et al. | |
| 2007/0221471 A1 | 9/2007 | Fourney et al. | |
| 2008/0169171 A1 | 7/2008 | Itoh et al. | |
| 2009/0065327 A1 | 3/2009 | Evangelista et al. | |
| 2009/0113853 A1 | 5/2009 | Porter et al. | |
| 2010/0272961 A1 | 10/2010 | Costin | |
| 2014/0041989 A1 | 2/2014 | Wallace | |
| 2014/0290827 A1 | 10/2014 | Heeman | |
| 2014/0346008 A1 | 11/2014 | Hoynash | |
| 2015/0144536 A1 | 5/2015 | Dugat | |
| 2016/0016684 A1 | 1/2016 | Dugat | |
| 2016/0083196 A1 | 3/2016 | Dugat | |
| 2017/0008706 A1 | 1/2017 | Dugat | |
| 2017/0057756 A1 | 3/2017 | Dugat et al. | |

OTHER PUBLICATIONS

PCT/US2014/025098 International Preliminary Report on Patentability dated Sep. 24, 2015, 8 pages.
PCT/US2014/025076 International Search Report and Written Opinion dated Jul. 8, 2014, 12 pages.
News Track Converyor Units Brochure, Mar. 2013, 2 pages.
PCT/US2014/025076 International Preliminary Report on Patentability dated Sep. 24, 2015, 10 pages.

* cited by examiner

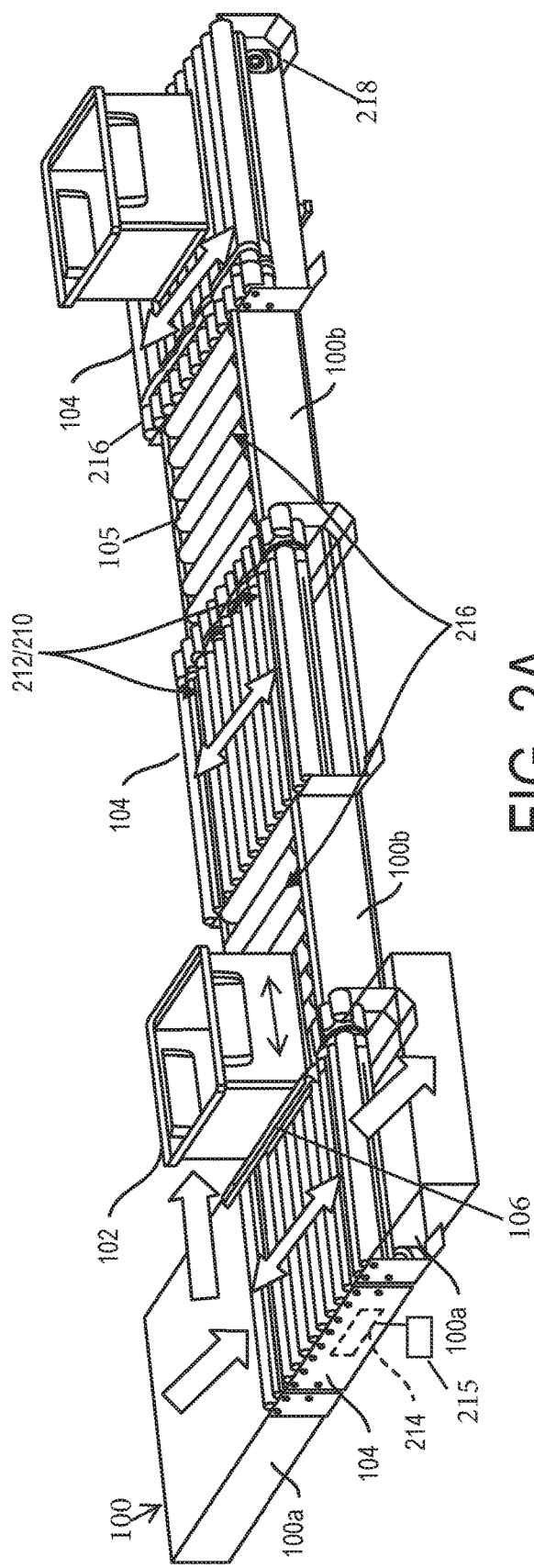
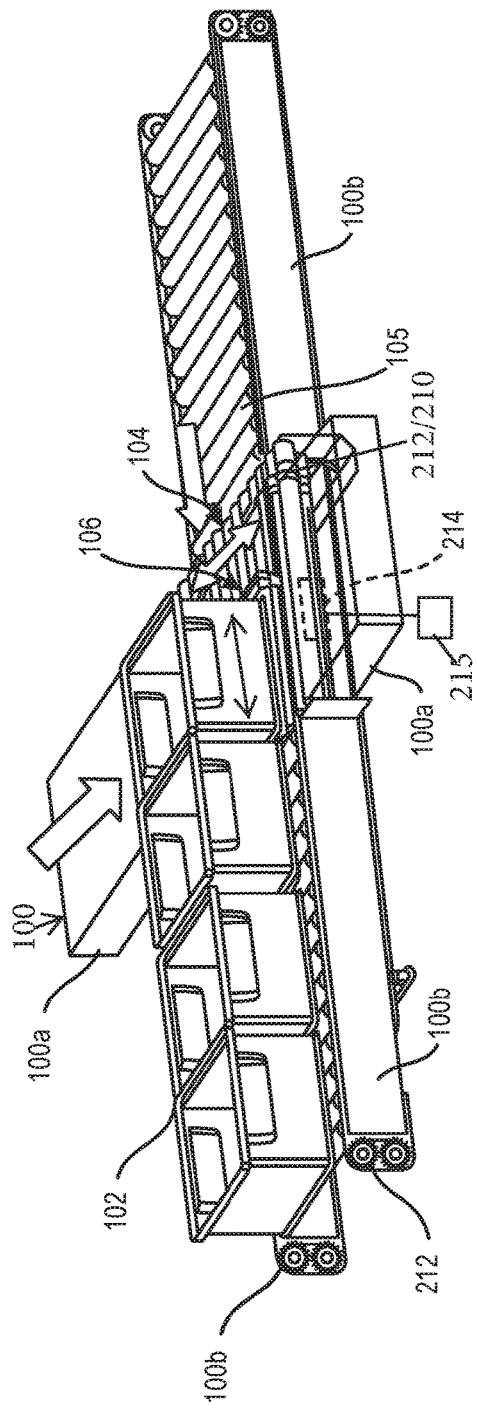
FIG. 2A
FIG. 2B

METHOD OF DIVERTING ITEMS - 900

PROVIDING THE HYBRID DIVERTER COMPRISING:

A BASE COMPRISING A BASE FRAME AND BASE ROLLERS, THE BASE FRAME POSITIONABLE ABOUT THE CONVEYOR, THE BASE ROLLERS ROTATIONALLY SUPPORTED ON THE BASE FRAME TO DEFINE A BASE PATH FOR PASSING THE ITEMS THEREALONG, THE BASE PATH IN ALIGNMENT WITH A CONVEYOR PATH OF THE CONVEYOR; AND

A TRANSFER ASSEMBLY, COMPRISING:

A TRANSFER DRIVE SUPPORTED BY THE BASE, THE TRANSFER DRIVE COMPRISING A FIRST INDEPENDENT DRIVE TRACK AND A SECOND INDEPENDENT DRIVE TRACK; AND

A TRANSFER BAR HAVING A FIXED END CONNECTED TO THE FIRST FIRST INDEPENDENT DRIVE TRACK AND A SLOTTED END MOVABLY CONNECTABLE TO THE SECOND INDEPENDENT DRIVE TRACK, THE TRANSFER BAR MOVABLE BY THE FIRST INDEPENDENT DRIVE TRACK AND THE SECOND INDEPENDENT DRIVE TRACK ALONG A VARIABLE TRANSFER PATH ABOUT THE BASE, THE TRANSFER BAR HAVING A SURFACE FOR ENGAGEMENT WITH TEH ITEMS WHEREBY, UPON ACTIVATION OF THE FIRST AND THE SECOND INDEPENDENT DRIVE TRACK, THE TRANSFER BAR SELECTIVELY DIVERTS THE ITEMS AWAY FROM THE CONVEYOR PATH. — 980

PASSING THE ITEMS ALONG THE CONVEYOR PATH OF THE CONVEYOR — 982

DIVERTING THE ITEMS FROM THE CONVEYOR PATH OF THE CONVEYOR BY ACTIVATING THE TRANSFER DRIVE TO DRIVE THE TRANSFER BAR AND TO PUSH THE ITEMS ALONG THE VARIABLE TRANSFER PATH — 984

ADVANCING THE TRANSFER BAR BY INDEPENDENTLY ROTATING BELTS OF EACH OF THE FIRST INDEPENDENT DRIVE TRAIN AND THE SECOND INDEPENDENT DRIVE TRAIN AND ALLOWING THE SECOND MOVABLE END OF THE TRANSFER BAR TO SLIDE ABOUT THE SECOND INDEPENDENT DRIVE TRAIN. — 986

ADVANCING AND ROTATING THE TRANSFER BAR. — 988

ADVANCING AND ROTATING THE TRANSFER BAR TO A FIRST POSITION, AND THEN ADVANCING THE TRANSFER BAR TO A SECOND POSITION WHILE ROTATING THE TRANSFER BAR. — 989

FIG. 9

HYBRID DIVERTER WITH MULTI-ACTION TRANSFER BAR AND METHOD OF USING SAME

CROSS-REFERENCE TO RELATED APPLICATIONS

This application claims the benefit of U.S. Provisional Application No. 62/723,353, filed Aug. 27, 2018, the entire contents of which is hereby incorporated by reference to the extent not inconsistent with this disclosure.

BACKGROUND

The present disclosure relates generally to handling equipment. More specifically, the present disclosure relates to conveyors, sorters, and/or related equipment used in handling materials.

Conveyors include mechanical structures extending from one location to another to move materials between such locations. For example, manufacturing industries may use conveyors to pass product components between workstations at the locations to enable assembly of the product components into a finished product. Such conveyors are fixed in place (e.g., bolted to the floor) in a manufacturing facility, and include frames with rollers or belts that enable the product components to pass along the frame to the workstations. Such conveyors may also be provided with replaceable rollers or belts that may wear out over time.

The fixed conveyors may extend between multiple locations in the facility. Sorting devices may be provided to divert the materials along the conveyors to certain locations in the facility. For example, facilities with large distribution centers, such as retail stores, may have automated sorting equipment coupled to the fixed conveyors to sort and divert packages along various portions of the conveyors to locations in the facility. The facilities may also employ forklifts and carts to transport the materials to or from the conveyors.

Conveyors may be provided with mechanisms, such as transfers, tilt trays, and pushers, to facilitate the movement of materials. Examples of mechanisms that may be used are provided in U.S. Pat. Nos. 5,971,132; 4,200,178; 9,334,111; 5,984,078; and 6,227,377. Other conveyors and/or conveyor mechanisms are provided in U.S. patent application Ser. Nos. 14/550,826; 62/210,348; 15/248,967; 14/775,551; 15/273,370; 14/859,295; and U.S. Pat. No. 9,926,094 owned by Applicant, the entire contents of which are hereby incorporated by reference herein to the extent not inconsistent with this disclosure.

Despite advances in conveyor technology, a need for more efficient and flexible means for conveying, transferring, and sorting materials in a variety of configurations remains. The present disclosure seeks to fill such needs.

SUMMARY

In at least one aspect, the disclosure relates to a hybrid diverter for a conveyor. The conveyor defines a conveyor path between locations for transporting items therebetween. The hybrid diverter comprises a base and a transfer assembly. The base comprises a base frame and base rollers. The base frame is positionable about the conveyor. The base rollers are rotationally supported on the base frame to define a base path for passing the items therealong. The base path is in alignment with a conveyor path of the conveyor. The transfer assembly comprises a transfer drive supported by the base and a transfer bar. The transfer drive comprises a first independent drive track and a second independent drive track. The transfer bar has a fixed end connected to the first independent drive track and a slotted end movably connectable to the second independent drive track. The transfer bar is movable by the first independent drive track and the second independent drive track along a variable transfer path about the base. The transfer bar has a surface for engagement with the items whereby, upon activation of the first independent drive track and the second independent drive track, the transfer bar selectively diverts the items away from the conveyor path.

In another aspect, the disclosure relates to a conveyor system for transporting items between locations. The conveyor system comprises a conveyor and a hybrid diverter. The conveyor comprises a conveyor frame with conveyor rollers thereon defining a conveyor path between the locations. The hybrid diverter comprises a base and a transfer assembly. The base comprises a base frame and base rollers. The base frame is positionable about the conveyor. The base rollers are rotationally supported on the base frame to define a base path for passing the items therealong. The base path is in alignment with a conveyor path of the conveyor. The transfer assembly comprises a transfer drive supported by the base and a transfer bar. The transfer drive comprises a first independent drive track and a second independent drive track. The transfer bar has a fixed end connected to the first independent drive track and a slotted end movably connectable to the second independent drive track. The transfer bar is movable by the first independent drive track and the second independent drive track along a variable transfer path about the base. The transfer bar has a surface for engagement with the items whereby, upon activation of the first independent drive track and the second independent drive track, the transfer bar selectively diverts the items away from the conveyor path.

Finally, in another aspect, the disclosure relates to a method of diverting items about a conveyor. The method comprises providing the hybrid diverter as in claim 1; passing the items along a conveyor path of the conveyor; and diverting the items from a conveyor path of the conveyor by activating the transfer drive to drive the transfer bar and to push the items along the transfer path.

The summary is not intended to be limiting on the disclosure or the claims provided herein, and is to be considered in light of the drawings and description provided herein.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIGS. 2A and 2B show example conveyors with hybrid diverter in a multi-transfer and a sequencing configuration, respectively.

FIG. 9 show a flow chart depicting a method of diverting items.

DETAILED DESCRIPTION

Figure 1A:
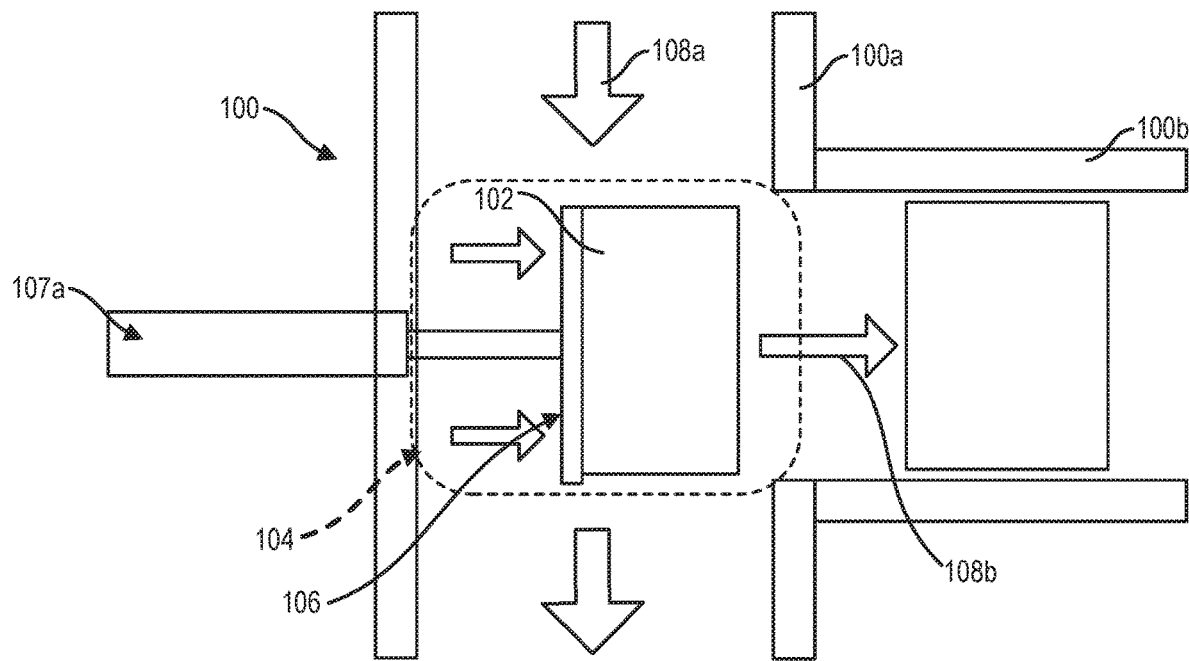
FIGS. 1A-1C show example conveyors with hybrid diverters in a right angle, acute angle, and multi angle transfer configuration, respectively.

The description that follows includes exemplary apparatus, methods, techniques, and/or instruction sequences that embody techniques of the present subject matter. However, it is understood that the described embodiments may be practiced without these specific details.

The present disclosure relates to an apparatus used in material handling applications for diverting (i.e. transferring or sorting) of various items (e.g., cases, materials, boxes, parcels, packages, totes, cartons, bags, containers, etc.) of various sizes and/or shapes. In particular, the apparatus is a conveyor mechanism, sometimes referred to as a hybrid diverter (i.e. transfer or sorter) with hybrid motion capabilities for diverting (i.e. transferring or sorting) items passing along a conveyor. This 'hybrid' motion allows the hybrid diverter to adjust to a variety of conveyor configurations for performing transfer operations at a variety of angles, such as a combination of acute angle and/or right-angle transfers.

The hybrid diverter may include a base with base rollers and a transfer bar movable about the base to transfer items away from the conveyor. The transfer bar is driven by a transfer drive for multi-action (e.g., multi-angle) capabilities. This multi-action capability allows the transfer bar to employ a compound motion to positively push items at a variety of rates, angles, directions, orientations, etc. The transfer drive is capable of advancing the transfer bar at various angles to push the items along a transfer path in a desired direction away from the conveyor.

This hybrid diverter is a programmable dual axis sorter with hybrid motion to divert the items away from the conveyor at the desired angle. With this programming, the transfer bar may be operated in a single motion, dual motion, or variable motion along the transfer path. One or more of the hybrid diverters may be positioned about portions of the conveyor to form a conveyor system (i.e., system of conveyors and diverters) for selectively diverting the items as desired.

The multi-action (e.g., multi-angle, multi-bar, etc.) transfer bar has an integrated design intended to simplify the manufacture, use, reliability, repair, part replacement, and/or operation of the diverter. This hybrid motion may combine motions, such as right-angle transfer and/or acute angle (e.g., 30 degree) transfer, to enable the diverter to be tolerant of various item positions, size, and angles, thereby improving sorting accuracy for a wider range of the items.

The hybrid diverter is intended to prevent turning of the items during transfer and/or to operate at speeds comparable with the speed of the main conveyor, thereby reducing a slow-down in speed at the hybrid diverter. The hybrid diverter may use force with friction to transfer the items away from the conveyor path of the conveyor. The hybrid diverter is intended for use with a variety applications, including applications prone to jamming between parts of the hybrid diverter and/or conveyor, as well as in applications where the items may be in any position (e.g., turned or out of position).

The hybrid diverter also seeks to provide one or more of the following capabilities, among others: high speed transfer, reduced turning of items, fast throughput, integrated components, reduced parts, modular design, programmable components, operable with a variety of conveyors, programmable to transfer at different forces and/or vectors, simplified design, reduced cost to manufacture, optimized performance, compound motion, increased sorting accuracy, operability with a variety (position, size, and features) of items, compact design, flexible use, high sort rate in a small footprint, ability to handle a large range of item dimensions, bi-directional sortation, programmable divert angle, combination capabilities, multiplexing sorter, combination steering and push off, shallow angle sort with very high speeds and compact footprint, multi-angle engagement profile, dual bar design, optional bar clearing motion, auto positioning of transfer bars, ability to push in ether direct as previous item is cleared, dual motor drive, increased rate and weight handling ability, reduced part count, reduced part costs, eliminated lifting mechanisms, pulleys and guides to simplify the design, simple assembly, reduced assembly time and/or labor, low profile, stackable design, etc. Note that among embodiments exhibiting one or more of these capabilities, not all embodiments may exhibit them to the same degree.

FIGS. 1A-2B show example configurations of a conveyor 100 for passing the items 102 between locations. FIGS. 1A-1C show example conveyors 100 with a hybrid diverter 104 with a transfer bar 106 in a right angle, acute angle, and multi angle transfer configuration, respectively. One or more of the hybrid diverters 104 are positioned between portions of the conveyor 100. As shown, the conveyor 100 includes a conveyor frame 103 with conveyor rollers 105 (FIG. 1C). The conveyor 100 may have various configurations including a main conveyor portion 100*a* defining a conveyor path 108*a* for passing the items 102, and one or more branch conveyor portions 100*b, c* extending from the conveyor path 108*a*. The branch conveyor portions 100*b, c* may lead to additional conveyor portions or to stations (e.g., sorting bins) for removal from the conveyor 100.

The conveyor 100 and the hybrid diverter 104 are used to transfer the items 102 away from the conveyor path (or line) 108*a* and/or away from the direction of flow of the conveyor. The hybrid diverter 104 may move the items 102 along the conveyor path 108*a* as the items 102 enter the hybrid diverter 104. The hybrid diverter 104 may then be activated to push the items 102 along a transfer path 108*b, c* to the branch conveyor portions 100*b, c*.

FIG. 1A shows the hybrid diverter 104 operating in a normal force, right-angle pusher configuration. In this example, the transfer bar 106 applies a normal force against the item 102 to push it in a direction that is at a right angle (i.e., 90 degrees) from the conveyor path 108*a*. The transfer bar 106 then pushes the item 102 along the transfer path 108*b* and onto the branch conveyor portion 100*b*. This example allows the transfer bar 106 to operate similar to a piston driven pusher mechanism 107*a* as schematically shown.

As shown in the example of FIG. 1A, branch (i.e., take away) conveyor portion 100*b* runs in a direction 90 degrees from the conveyor path 108*a*, and the right-angle hybrid diverter 104 moves the item 102 from the main conveyor portion 100a to a new position in the direction 90 degrees from the conveyor path 108a. The flow of the item 102 to the branch conveyor portion 100b shifts its movement 90 degrees, and, therefore, changes the direction of flow of the item 102 changes 90 degrees relative the direction of flow from the main conveyor portion 100a. Since the item 102 is pushed over (e.g., from right to left) without turning, the orientation of the item 102 has not changed relative to its original direction.

Figure 1B:
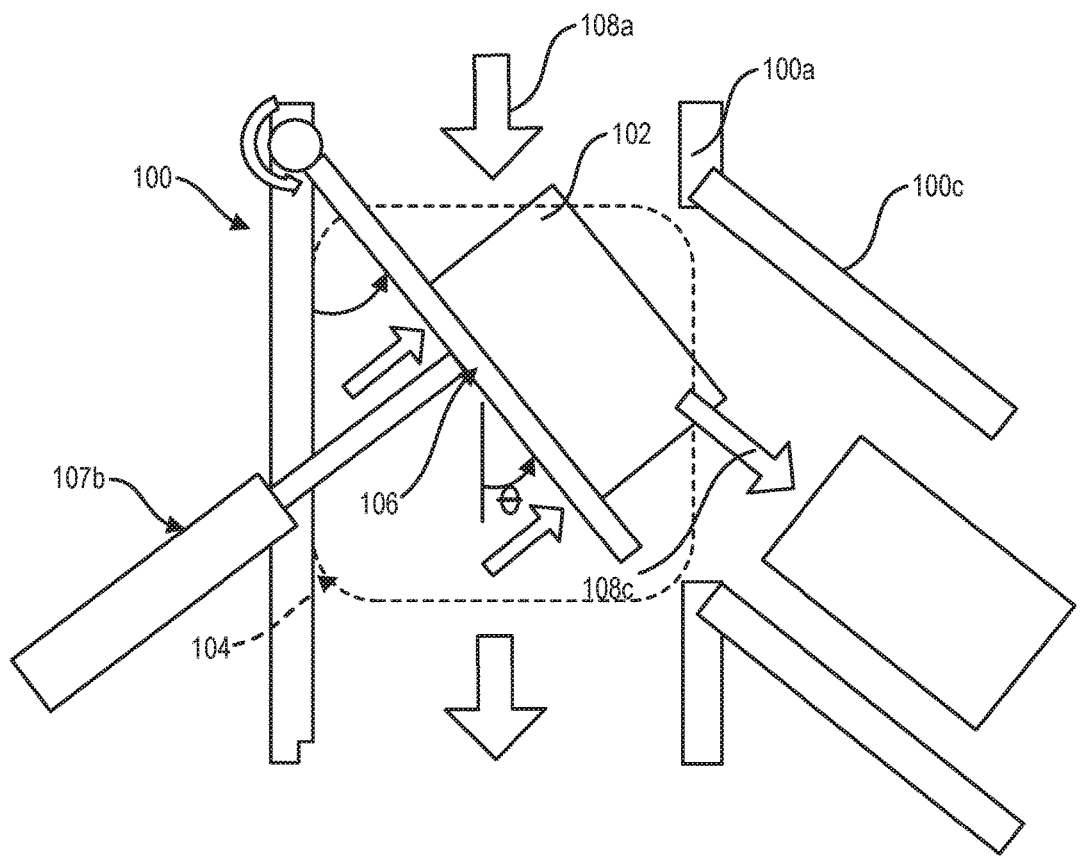

FIG. 1B shows the hybrid diverter 104 operating as an acute angle (e.g., 30-degree transfer), pivot (swing arm) sorter. In this example, the transfer bar 106 may move with the normal force applied to the item 102 at the acute angle ($\Theta$). As shown in the example of FIG. 1B, the acute angle hybrid diverter 104 operates similarly to the right-angle transfer of FIG. 1A, except that the hybrid diverter 104 pushes the item 102 from the conveyor path 108a without changing its orientation and by steering the item 102 off the conveyor path 108a at the acute angle ($\Theta$) of 30 degrees. This example allows the transfer bar 106 to operate similar to a piston and pivot driven swing arm mechanism 107b as schematically shown.

Figure 1C:
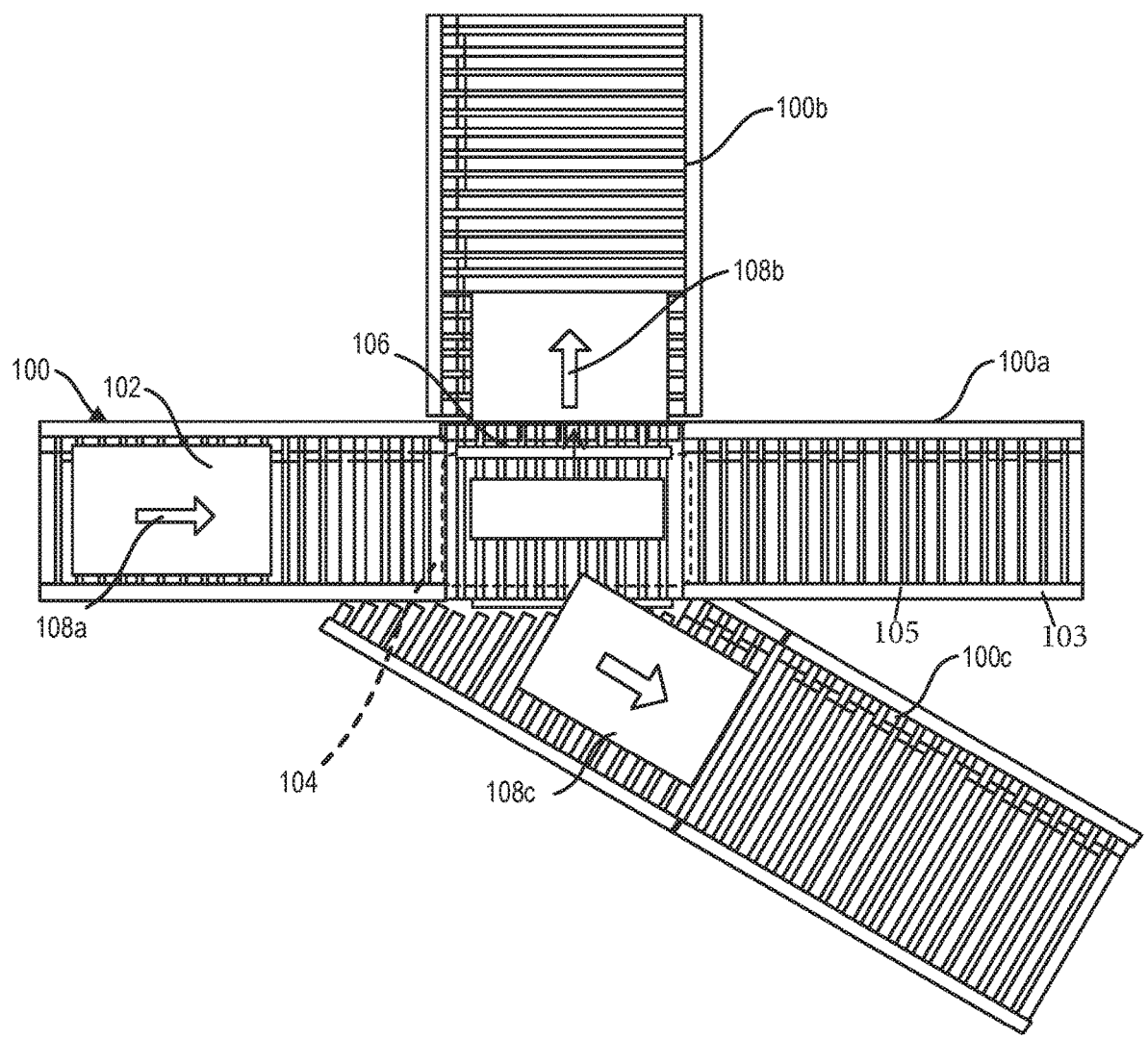

FIG. 1C shows the hybrid diverter 104 in a multi-action transfer configuration. As shown in this example, the transfer bar 106 is activatable to move at various angles to selectively push the items 102 to desired branch conveyor portions 100b or 100c as desired as is described further herein. This hybrid diverter 104 can be classified as a multi-angle transfer for use as both as a right-angle transfer and/or as an acute angle transfer from the same sort point. The hybrid diverter 104 also has combination capabilities for multiple sort capabilities from a single location, and may be designed as a unitary component that can be used in various ways to solve a wider array of material handling to diverts items from the conveyor path 108a (a main stream of flow).

Referring collective to FIG. 1A-1C, the hybrid diverter 104 may be positioned along the conveyor 100 for diverting the items 102 from the conveyor path 108a to a number of sort destinations along the transfer paths 108b, c extending from the main conveyor portion 100a. Such hybrid diverters 104 may be used in sortation systems of distribution centers where various goods are sorted for different shipping channels, such as to retail locations or Direct to Consumers ("DTC"). Diverting the item 102 from the conveyor path 108a (i.e., direction of flow) to a sort point at one of the branch conveyor portions 100b, c may require force acting on the item 102 to move the item 102 along the transfer path 108b, c and to an outlet (e.g., a chute, container, or another conveyor—not shown). The hybrid diverter 104 may deliver this force to the item 102 by gravity, normal force, and/or friction.

The hybrid diverter 104 may include features to facilitate transfer of the item 102 from the main conveyor portion 100a to the branch conveyor portions 100b, c. Examples of sorter features that may be used with the hybrid diverter 104 are those employed in shoe sorters, pushers, diverting arms, and paddle sorters (see, e.g., FIGS. 1A and 1B). The hybrid diverter 104 may be configured for use with items 102 of given rigidity and/or height to receive and handle mechanical transfer force associated therewith.

In an example, the hybrid diverter 104 may include tilt tray and bomb bay style options (not shown) that use gravity to transfer items from the conveyor path 108a. The hybrid diverter 104 may also use force friction as a moving force with raised belt sorters, cross belt sorter, narrow belt sorters, pop-up wheel sorters, pop up band sorters, and/or activated roller belt sorters. In addition, the friction and/or other forces, such as molecular adhesion, may be used to increase "grip" on the item 102 as it is transferred. The grip may apply to a given contact area and a given weight of the item 102. The hybrid diverter 104 may also move the items 102 by engaging a side of the item 102 to push the item 102. Acceleration of the item 102 from the diverter hybrid 104 to the branch conveyor portions 100b, c may be gradual and subject to a given travel length for accelerating the item 102.

The angle ($\Theta$) of departure from the hybrid diverter 104 to the branch conveyor portion 100b can vary, for example, in a range of from about 20 to about 90 degrees (e.g., 30 degrees) from the main conveyor portion 100a. The configuration (e.g., angle $\Theta$) of the hybrid diverter 104 may be defined to meet cost, space, speed, function, or other specifications. The hybrid diverter 104 may be operable as shown in one or more configurations presented herein. They hybrid diverter 104 may also be used in combination with one or more other hybrid, push rod, swing arm, right angle, acute angle, tight angle, and/or other diverters. For example, in some cases, transferring the items 102 at some angles may increase costs for changing an orientation of the item. Certain hybrid diverters 104 may sometimes use a more inexpensive solution (e.g., a simple pneumatic pusher). In another example, the configuration of the angle may alter space requirements for transferring. In some cases, the hybrid diverter 104 may have a tight angle configuration that provides a more compact layout and/or smaller footprint. Some configurations of acute angle transfers may take more space to maintain the item 102 orientation during transfer.

In another example, speed and rate may be affected by the configuration. The angle ($\Theta$) may be reduced to increase speed of transfer. Forward motion of the item 102 may stop or slow to allow the item 102 to be moved off. Directing the item 102 off the conveyor path 108a by steering the item 102 off the main conveyor portion 100a and along a curve or at a reduced angle may reduce slowing the speed of the item 102 and thereby produce a higher rate.

Finally, function and/or reliability may be affected by the configuration. Simple bottom surface steering diverters may be less reliable when diverting heavier and higher speed items. The amount of friction or driving force from the bottom may not be high enough to handle high inertias. Gate style transfers pushing from the sides (pivoting guard rail or pusher bar) may produce positive item engagement. Rate and/or throughput may be affected in cases where the design of the pusher (or bar or rail) may need to clear the space before the next item can proceed.

FIGS. 2A and 2B show example conveyors 100 with the hybrid diverter 104 in a multi-transfer and a sequencing configuration, respectively. In these FIGS. 2A and 2B, views of the hybrid diverter 104 are shown positioned along various portions of the conveyors 100. These figures show operation of the hybrid transfer 104 to advance items 102 from the main conveyor portion 100a to branch conveyor portions 100b by advancing the items 102 from the conveyor 100 onto the hybrid diverter 104, and then pushing the item 102 with the transfer bar 106 to the branch conveyor portion 100b.

As shown in the example of FIG. 2A, multiple hybrid diverter 104 may be positioned between two or more of conveyor portions 100a, b for selectively passing the items 102 therebetween. The hybrid diverters 104 may be joined together with the conveyor portions 100a, b to perform multiple transfers. The main conveyor portion 100a may feed to a first of the hybrid diverters 104, and the hybrid diverter 104 may pass the item to one or more of the branch conveyor portions 100b and the additional hybrid diverters 104 therebetween. Each of the hybrid diverters 104 may be used to pass the item 102 from the main conveyor portion 100a to the branch conveyor portions 100b via the hybrid diverters 104. Additional conveyor portions (not shown) may optionally be provided for passing the items from each of the hybrid diverters 104.

Each of the hybrid diverters 104 may include a base frame 218 with base rollers 216 thereon, and with one or more transfer bars 106 driven by a transfer drive 212. As demonstrated by these figures, the transfer drive 212 may include a motor 214 and drive tracks 210 (e.g., driven belts, chains, or trains). The hybrid diverters 104 may be joined together with a common transfer drive 212. The drive tracks 210 can be extended around the base frames 218 of the hybrid diverters 104 to push the items 102 from the main conveyor portions 100a over to one or more of the branch conveyor portions 100b.

The transfer drive 212 may use one or more of the motors 214 connected to extended drive tracks 210 for moving the items 102 over extended distances between two or more of the branch conveyor portions 100b. The controller 215 may be set to activate the motor 214 based on manual and/or automatic commands, and/or by sensors positioned about the conveyor 100 and/or the hybrid diverter 104 as is described further herein.

The motor 214 may be operated using the controller 215 to selectively drive the base rollers 216 and activate one or more of the drive tracks 210 to cycle and advance the transfer bar 106. For example, the base rollers 216 may be activated to advance the items 102 along a base path of the base rollers 216 in a direction aligned with the conveyor path 108a, and then the transfer drive 212 may be activated to move the drive tracks 210 and the transfer bar 106 to push the items 102 along the transfer path 108b to the branch conveyor portions 100b.

Upon activation, the item 102 may be pushed by the transfer bar 106 (which is driven by the drive tracks 210) to a position on either side of the conveyor rollers 105 of the branch conveyor portions 100b. In at least some cases, requirements for the conveyor rollers 105 in the branch conveyor portions 100b between conveyors may be reduced (e.g., from powered to non-powered rollers) using design simplicity and savings in parts of this configuration. Optionally, a single motor 215 and/or one or more of the conveyor portions 100b may be used to drive the transfer bar 106. Additional motors of the transfer drive 212 may not be needed or may be optional for use in one or more of the branch conveyor portions 100b.

In the sequencing configuration example of FIG. 2B, the items 102 may be accumulated for sequencing and/or storage. As shown by this example, extended lengths of non-powered rollers 105 can hold the items 102 for accumulation and storage. The hybrid diverter 104 is positioned along the main conveyor portion 100a with the branch conveyor portions 100b extending on either side thereof. The items 102 are passed from the main conveyor portion 100a and onto the branch conveyor portions 100b by the hybrid diverter 104.

The hybrid diverter 104 may use the transfer drive 212 and a single motor 214 to move and cingulate the items 102 stored to the branch conveyor portion 100b. The transfer bar 106 may be used to selectively move the items 102 between either of the branch conveyor portions 100b to prevent blockage of the main conveyor portion 100a and to allow access to certain of the items 102 stored along the branch conveyor portions 100b. The motor 214 may also be used to energize the hybrid diverter (and/or the main conveyor portion 100a) to move the item 102 from the main conveyor portion 100a to the hybrid diverter 104.

The motor 214 may be selectively activated by the controller 215 to operate the base rollers 216 and/or the transfer drive 212. The controller 215 may be used to selectively move the items 102 to and between the branch conveyor portions 100b. For example, upon activation, the controller 215 may advance the items 102 onto the hybrid diverter 104 and then onto the branch conveyor portions 100b as described in FIG. 2A. In another example, upon activation, the controller 215 may activate the transfer drive 212 to move the drive tracks 210 and the transfer bar 106, and to push the items 102 back and forth along the transfer path 108b between the branch conveyor portions 100b.

As also shown, the configuration in FIG. 2B is able store one or more (in this case four) of the items 102 and access each of the items 102 individually without unloading the items 102 ahead in the stack. When full, two of the items 102 may be stored on another of the branch conveyor portions 100b. The hybrid diverter 104 in this example may be provided with a second transfer bar (not shown). If the first item 102 is needed on another side, one of two transfer bars 106 may engage and push both of the items 102 to the opposite side. The extra room on the non-powered rollers 217 allows the items 102 blocking egress to be moved aside, thereby putting the blocked item 102 in the conveyor position. The second transfer bar can push the items 102 from the opposite branch conveyor portion 100b to bring other of the items 102 into position to unload from storage on the branch conveyor portions 100b.

The items 102 can be stored on the branch conveyor portions 100b in sets of one and three or two and two when full. Loading storage may require the transfer bar 106 to be pre-positioned opposite of the open side (one or no items 102). The items 102 may be stopped by the conveyor rollers 105 of the main conveyor portion 100a and the transfer bar 106 may pushes the item 102 off onto the branch conveyor portion 100b. This is one example demonstration of random access to stored items. Varying numbers of the items 102 can be stored as long as there is sufficient accumulation space to access the last item 102 loaded. In a last in/first out arrangement, no extra accumulation space may be required. Large numbers of the items 102 accumulated can be accessed with even a single one of the motors 214.

Figure 3A:
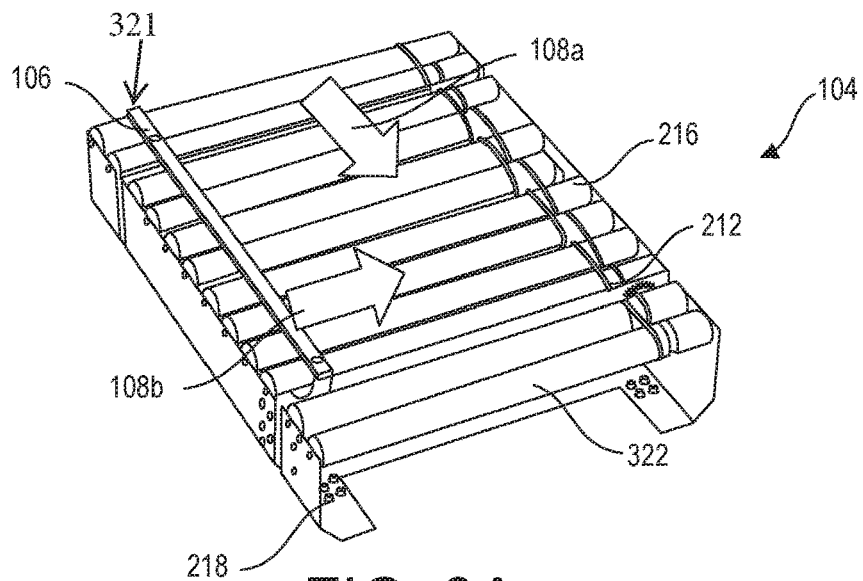
FIGS. 3A-3C show right perspective, left perspective, and plan views, respectively, of an example hybrid diverter.
Figure 3B:
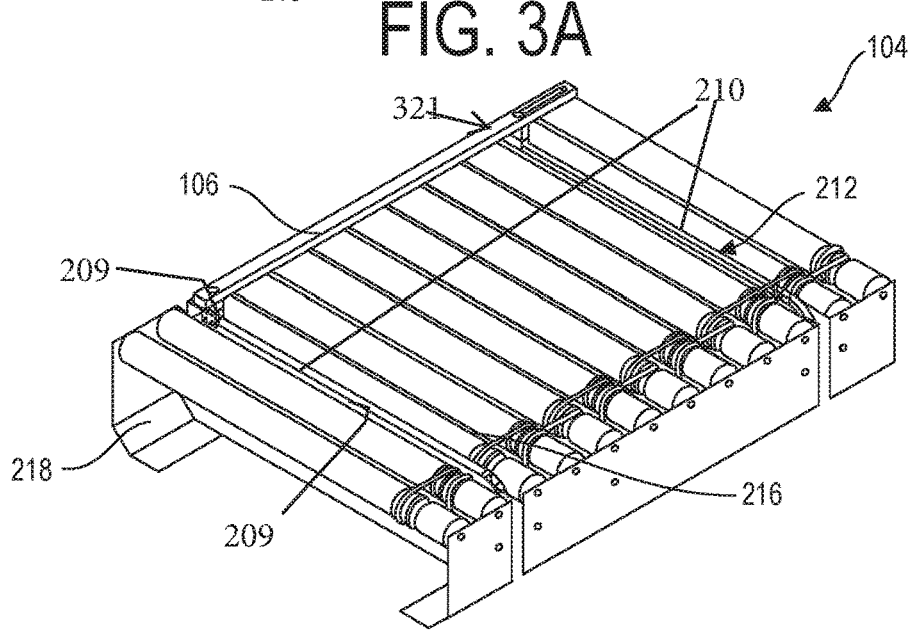
Figure 3C:
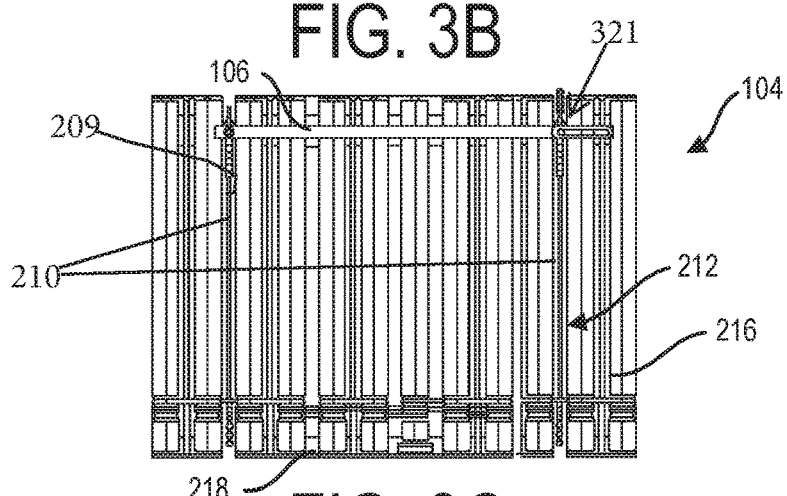

FIGS. 3A-6 show various views of portions of the hybrid diverter 104 in one particular embodiment. FIGS. 3A-3C show right perspective, left perspective, and top plan views, respectively, of an example hybrid diverter 104. These figures show an example configuration of the hybrid diverter 104 with a multi-action transfer bar 106 usable along the conveyor 100 for diverting the items 102 from the conveyor path 108a of the conveyor 100 (see e.g., FIGS. 1A-1C). The hybrid diverter 104 as shown is a module connectable along the conveyor 100 for diverting the items 102 away from the conveyor path 108a and along the transfer path 108b (see, e.g., FIGS. 1A-1C).

The hybrid diverter 104 includes a base frame 218, base rollers 216, and a transfer assembly 321. The base rollers 216 are aligned with the main conveyor (e.g., 100a of FIG. 1A-1C). The transfer assembly 321 includes the transfer bar 106 and the transfer drive 212. The base rollers 216 are rotationally positioned along the base frame 218 in alignment with the conveyor path 108a to pass the items therealong until the transfer drive 212 is activated to perform a transfer operation.

The transfer bar 106 is positioned transverse to the base rollers 216, and slides along a surface of the base rollers 216 for movement along the transfer path 108b during the transfer operation. The transfer bar 106 may move continuously with no breaks for low vector of force opposing the flow along the conveyor path 108a along the base rollers 216. The transfer bar 106 is connected to and driven by the transfer drive 212. The transfer drive 212 includes first and second independent drive tracks 210 positioned in gaps 209 between the base rollers 216.

Figure 4A:
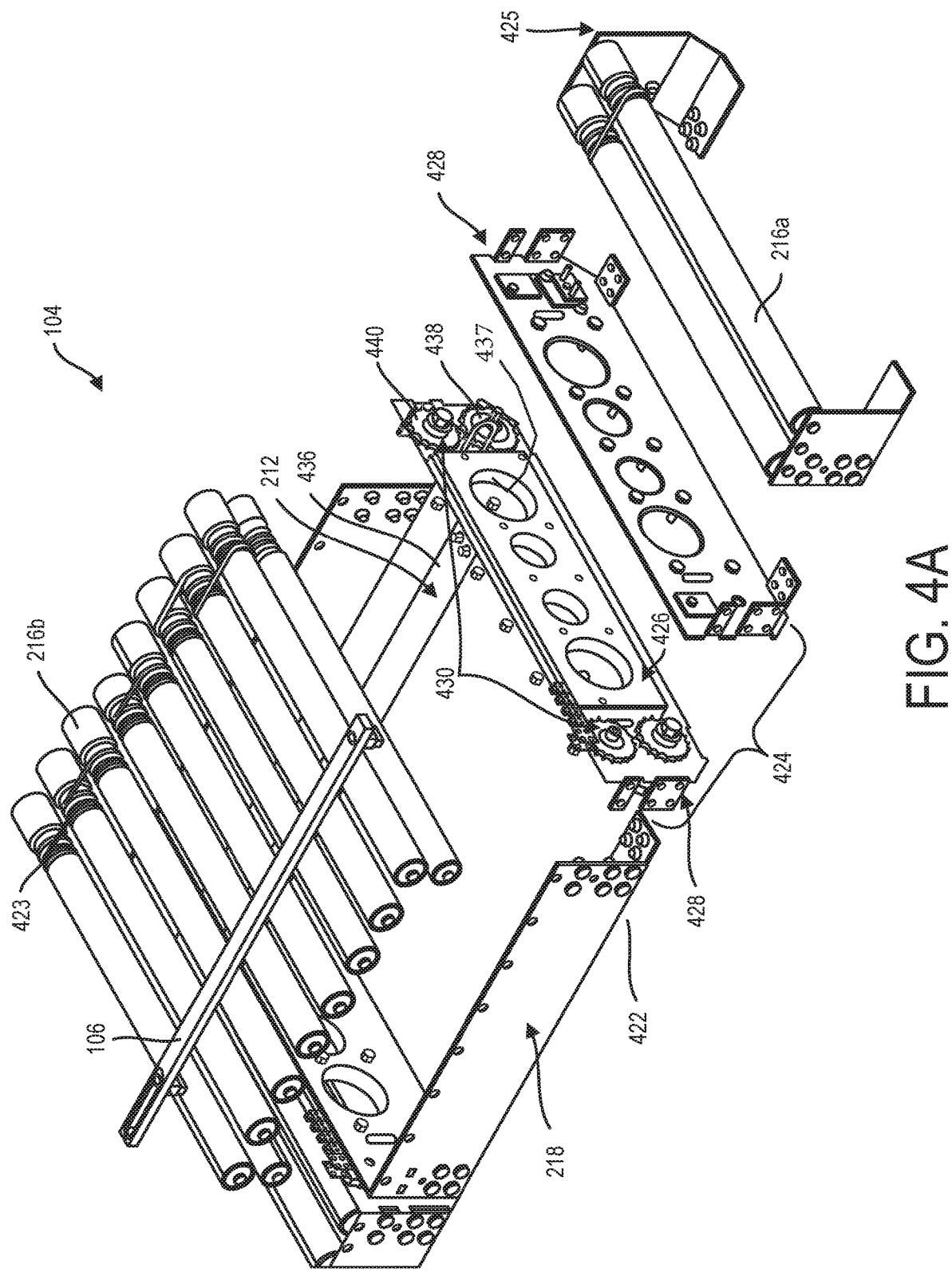
FIGS. 4A-4C show exploded views of portions of the hybrid diverter.
Figure 4B:
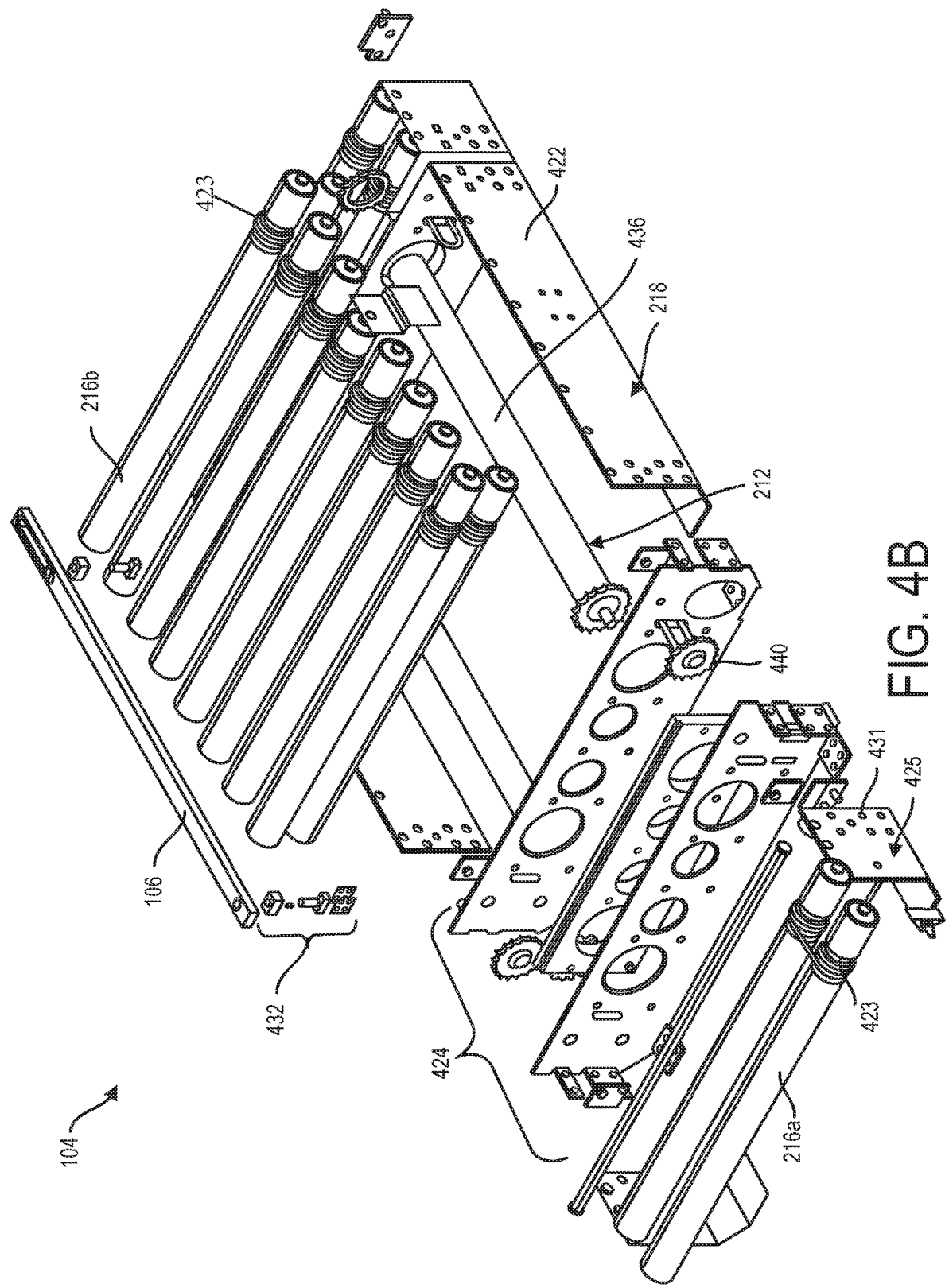
Figure 4C:
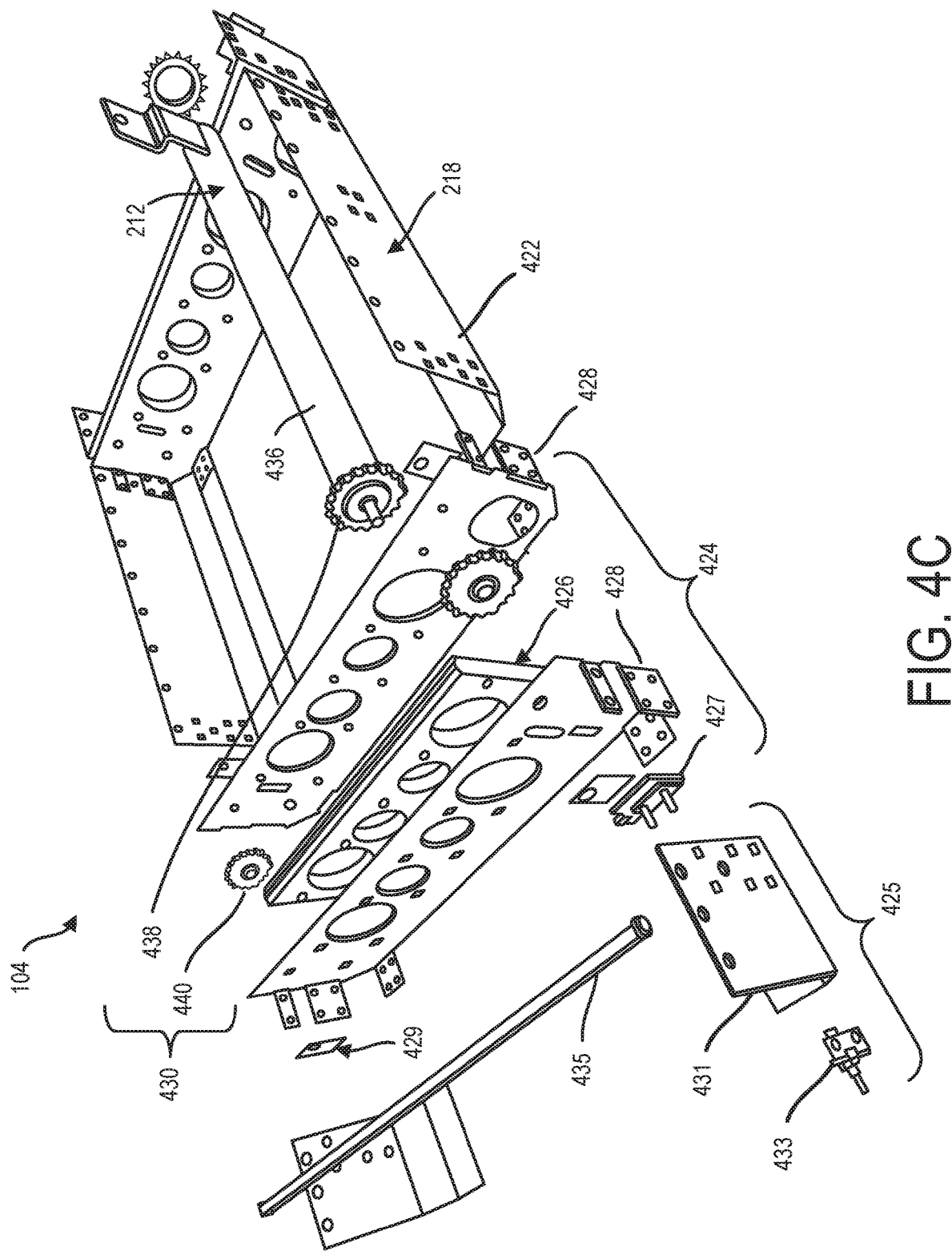

FIGS. 4A-4C shows exploded views of portions of the hybrid diverter 104. As shown in these views, the base frame 218 of the hybrid diverter 104 includes main frame rails 422 joined by sidewalls 424, and a roller driver 425. The sidewalls 424 include various components, such as compression (force transmission) blocks 426, inversion plates 428, and power trains 430. The sidewalls 424 may also include additional plates, such as the motor driven roller ("MDR") torque plate 427 and the counter sink plate 429 (FIG. 4C). The components of the sidewalls 424 may interconnect to provide walls of the base frame 218, and to support other components of the hybrid diverter 104. Ports 437 in the compression block 426 and the inversion plates 428 may reduce the weight and provide internal channels for wiring.

The base frame 218 also includes the roller driver 425 supported about each of the sidewalls 424 by brackets 431. The roller driver 425 includes the drive rollers 216a connected by the o-bands 423 for translating rotation therebetween. A sensor 433 (e.g., proximity sensor or photo eye) and sensor array 435 are coupled to the bracket 431 adjacent the drive rollers 216a for detecting the item 102 as it passes thereby. The roller driver 425 is coupled to a motor (not shown) for driving rotation of the drive rollers 216a.

Figure 5A:
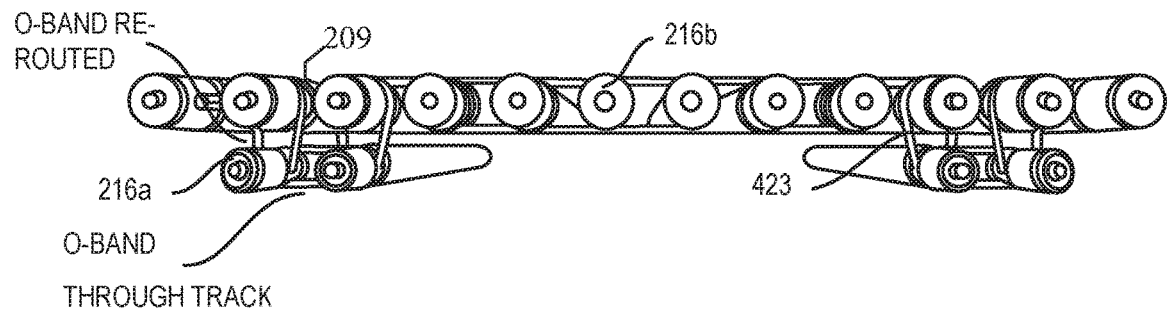
FIGS. 5A-5B show top and bottom perspective views of a portion of the hybrid diverter depicting the base rollers of the hybrid diverter.
Figure 5B:
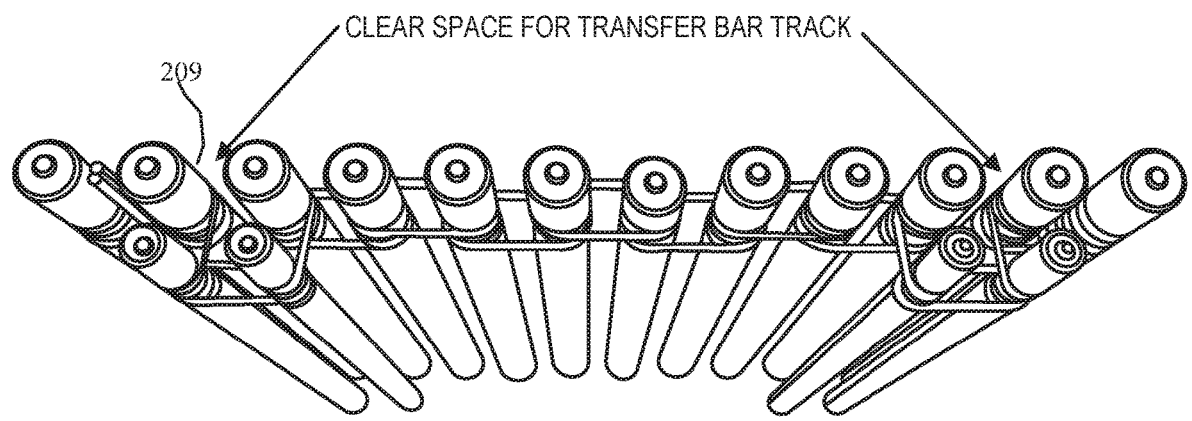

Top rollers 216b are rotationally supported on the frame rails 422, and connected together by o-bands 423. These top rollers 216b are coupled by the o-bands 423 to the drive rollers 216a for rotation thereby. FIGS. 5A and 5B show top and bottom perspective views of the rollers 216a, b of the hybrid diverter 104. As further shown in FIGS. 5A and 4B, the top rollers 216b are linearly aligned with the drive rollers 216a therebelow. The rollers 216a, b are interconnected for rotation together. The rollers 216a, b are spaced apart with the o-bands 423 routed about the rollers 216a, b to define the gap (space) 209 for receiving portions of the transfer drive 212 therebetween.

The o-bands 423 are provided around the rollers 216a, b, and are positioned so they do not interfere with the motion in the drive tracks 210 (track belt circuit) between the rollers 216a, b. Transmission of power for the rollers (main roller bed) 216a, b is routed through the inside of the track rotation circuit. This is accomplished with a sub-level secondary roller placement of the drive rollers 216a.

Referring back to FIGS. 4A-4C, the transfer bar 106 is positioned along a surface of the top rollers 216b and connected by bar connectors 432 to the transfer drive 212. The transfer drive 212 is support in the base frame 218 for connection with the transfer bar 106. The transfer drive 212 includes the transfer drive rollers 436 supported by the sidewalls 424, and MDR sprockets 438 at each end thereof. The MDR sprockets 438 are coupled to idler sprockets 440 positioned between the inversion plates 428 to form the power train 430.

Figure 6:
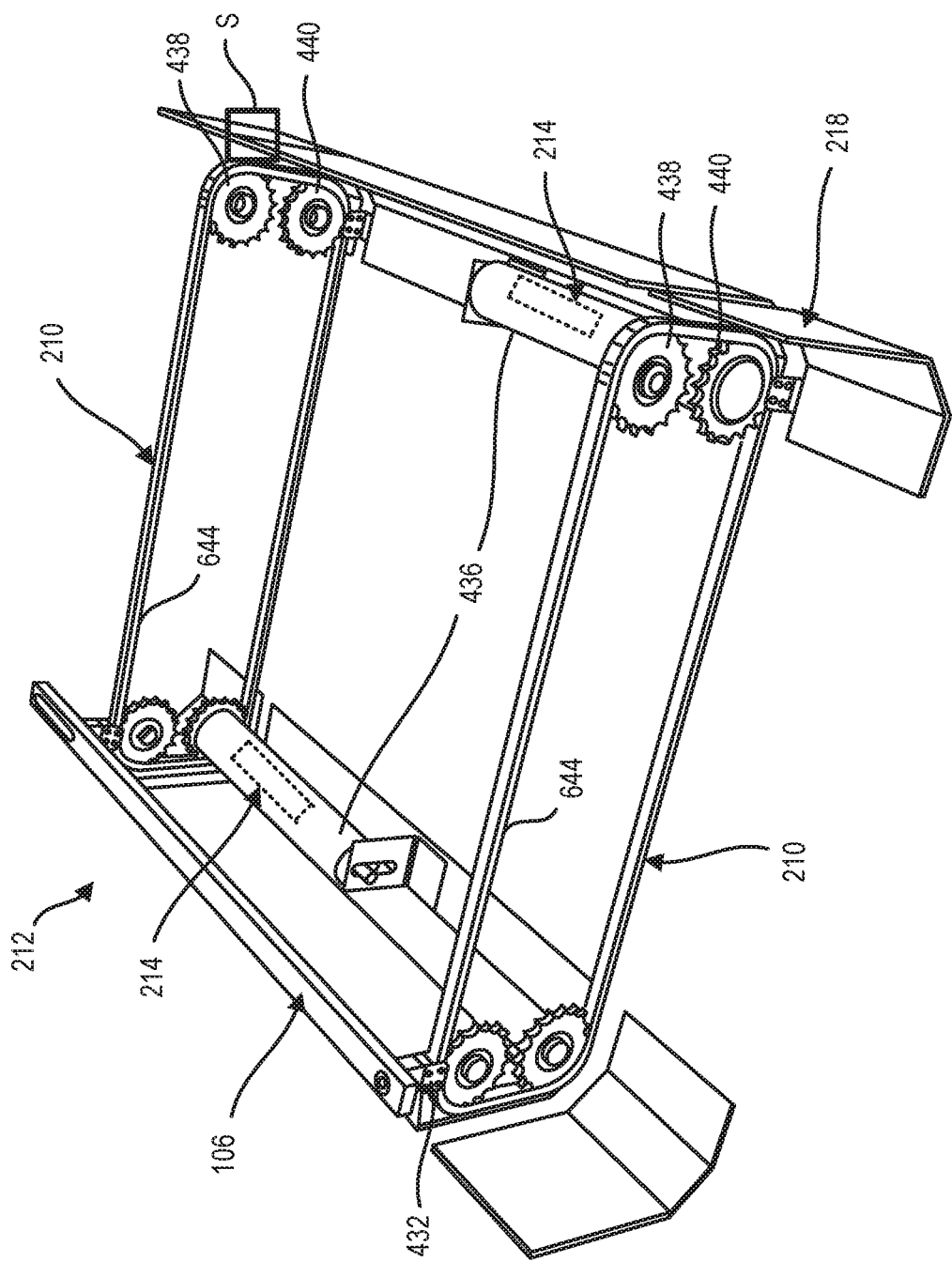
FIG. 6 shows a perspective view of a portion of the hybrid diverter depicting the transfer drive of the hybrid diverter.

FIG. 6 shows a perspective view of the transfer drive 212 of the hybrid diverter 104. As shown in further detail in FIG. 6, the transfer drive 212 may include the first and second independent drive tracks 210 secured to the base frame 218. Each of the first and second independent drive tracks 210 may include a belt 644 positioned about the sprockets 438 and 440. The transfer bar 106 may be driven by independent drivers, such as the first and second independent drive tracks 210. These independent driver trains 210 include dual driven belts 644 with independent motors 214 to vary track speed as is described further herein.

Each of the belts 644 are coupled by the sprockets 438 and 440 to a separate one of the transfer drive rollers 436 for rotation therewith. The transfer drive rollers 436 may each be driven by a separate or common transfer motor 214. The transfer drive roller 436 is driven by the motor 214 to rotate the MDR sprockets 438 and the idler sprockets 440, which then rotates the drive track 210 and the transfer bar 106.

Referring to FIGS. 4A-4C and 6, the transfer bar 106 is movable about the base frame by the first and second independent drive tracks 210. The transfer bar 106 may move along top of the top rollers 216b (FIGS. 4A-4C) by advancement of the first and second independent drive tracks 210. The transfer bar 106 may move back and forth along the top rollers 216b. Optionally, the transfer bar 106 may also move also rotate 360 degrees around the base frame 218 with the belts 644. The first and second independent drive tracks 210 may advance simultaneously to move the transfer bar 106 linearly, or advance at different rates to move the transfer bar 106 at an angle.

As also shown in FIG. 6, one or more of the sensors S may be provided to allow the transfer driver 212 to be selectively operated to advance each end of the transfer bar 106 as needed. For example, the sensors S may be provided to detect top heavy items that flip if pushed too rapidly. The sensors S may be used to activate the transfer driver 212 to adjust to advance to the configuration of the item 102. The sensors S may be coupled to the motor 214 and/or the controller 215 (see, e.g., FIGS. 2A-2B) to provide feedback for monitoring and control.

The hybrid diverter 104 may have the base frame 218 in an in-frame configuration with mechanical transmission components inside the base frame 218. This in-frame configuration may provide a belt circuit with structural inversion of frame forces with higher modularity and improved interface with adjacent portions of the main conveyor (see, e.g., 100 of FIGS. 1A-1C). The in-frame design may also eliminate a requirement for a special conveyor to receive diverted items 102. The in-frame design severs the base frame 218 and the transfer drive (rail components) 212 to provide a clear path for the rotation of the transfer bar 106 and its drive track 210. Frame components of the base frame 218 may be necked down into the area within the transfer bar 106 drive belt 644 loop through the inversion plates 428.

The inversion plates 428 are structural components of the hybrid diverter 104 that re-direct forces carried in the main frame rail 422 through the center of the drive track (belt circuit) 210. Structural strength may be maintained with a dual purpose ultra-high-molecular-weight ("UHMW") sandwich material between sheet metal cross frames in the base frame 218. Flexing, sheet metal deformation and shifting may be eliminated by large cross section of UHMW material under high compression secured by an array of through hole bolts along the base frame 218. The UHMW may also serve as a low friction guide surface for the belt (chain) 644.

The hybrid diverter 104 is configured to allow the transfer drive (belt circuit) 212 to stay within the frame rails 422 and maintain an unimpeded or clear path around the periphery of the frame rails 422. This may allow for compact construction, higher modularity and compatibility with existing conveyor designs.

The transfer bar 106 may traverse outside of the base frame 218 without any mechanical components outside of the rails 422 of the base frame 218. This provides a unique sandwich frame design which allows for the interruption of frame rails 422 without losing structural integrity. This also provides for minimal space between the base rollers 216 keeping center distances standard. As shown in FIGS. 2A and 2B, the transfer drive 212 may extend across multiple base frames 218 of multiple hybrid or other diverters.

Figure 7A:
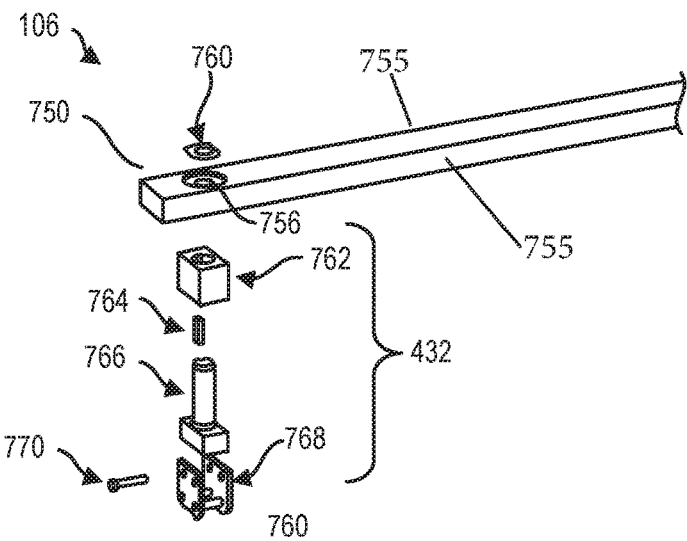
FIGS. 7A-7C show detailed views of a portion of the transfer bar depicting a fixed end, a slotted end, and bar rollers, respectively, of the transfer bar.
Figure 7B:
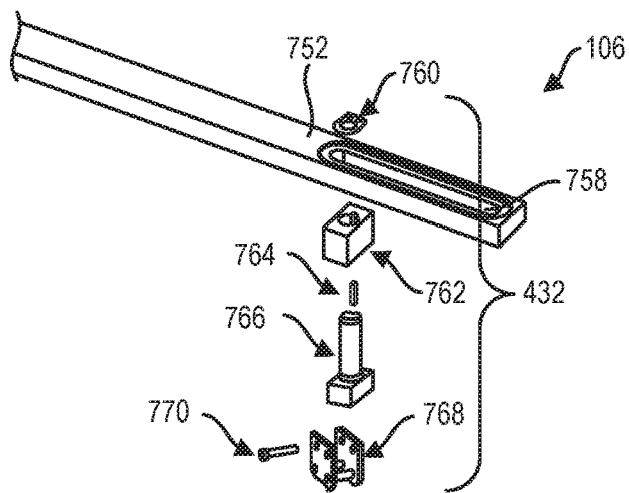
Figure 7C:
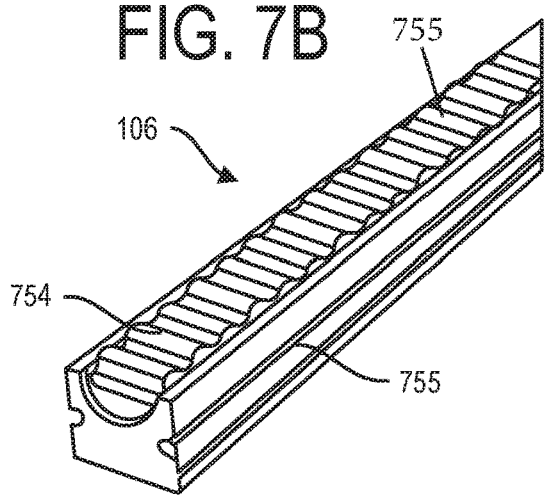

FIGS. 7A-7C are detailed views of a portion of the transfer bar 106 depicting a first fixed end 750, a second slotted end 752, and bar rollers 754, respectively, of the transfer bar 106. The transfer bar 106 is depicted as a solid elongate member (or block) with a surface (pusher face) 755 on one or both sides thereof for engaging the item 102 during a transfer operation (see, e.g., FIGS. 1A-2B). The transfer bar 106 has a hole 756 in the first fixed end 750, and a slot 758 in the second slotted end 752. The hole 756 of the first fixed end 750 is positioned for connection to the belt 644 of the first drive track 210 (shown in FIG. 6). The slot 758 of the second slotted end is positioned for connection to the belt 644 of the second drive track 210 (also shown in FIG. 6).

Each of the first fixed end 750 and the second slotted end 752 are connected to the first and second drive tracks 210 (shown in FIG. 6), respectively, by the bar connectors 432. The bar connectors 432 include a snap ring 760, a standoff 762, an anti-rotation key 764, a transfer pin 766, a belt sleeve (i.e. chain attachment) 768, and a screw 770. The standoff 762 is positionable against the first and second ends 750, 752 with the transfer pin 766 extending therethrough. The anti-rotation key 764 is positionable in the standoff 762 and the transfer pin 766 to prevent rotation therebetween. The belt sleeve 768 is connectable to the transfer pin 766 by the screw 770. The belt sleeve 768 is also shaped to receive and clamp to the belt 644 for movement therewith.

The bar connector 432 is fixed to the first fixed end 750, and the other bar connector 432 is slidingly connectable to the second slotted end 752. The transfer pin 766 of the bar connector 542 extends through the slot 758 and attaches to the snap ring 760 on an opposite side of the transfer bar 106. The transfer pin 766 is free to slide along the slot 758 as the transfer bar 106 is advance by the belt 644 connected thereto. The selective activation of the first and second drive tracks 210, and the shape of the slot 758 of the second slotted end 752 of the transfer bar 106 work together to manipulate the movement of the transfer bar 106 and thereby the transfer path 108*b* of the item 102 pushed by the transfer bar 106. The slotted end 752 of the transfer bar 106 allows the transfer bar 106 to turn as the first and second independent drive tracks 210 advance, thereby defining the variable transfer path 108*b* as described further herein(see, e.g., FIGS. 8A-8H).

As shown in FIG. 7C, the transfer bar 106 may also include the bar rollers 754 supported on a bar base 755. The bar base 755 has an elongate body with a receptacle along a top surface thereof shaped to receive the bar rollers 754. The bar rollers 754 are rotationally supported along a length of the elongate body. The bar rollers 754 define a low friction version of the surface 755 for engaging the items 102 to allow low force passage thereof. The transfer bar 106 may also be configured with low pitch side base versions of the bar rollers 754 for ultra-smooth near continuous surface engagement to prevent forces opposing the flow of the items 102 along the transfer path 108*b*.

As shown in FIGS. 3A-7C, the hybrid diverter 104 may be provided with various features and/or options to facilitate the transfer process. For example, additional sensors S (e.g., proximity, limit, photo-eye, and/or other sensors) may be provided about the hybrid diverter 104 and/or the conveyor 100 to monitor operation of the components and/or to detect the items 102. Optionally, additional transfer bars 106 may be positioned along the diverter to cycle and engage the items 102. Additional transfer bars 106 may be used to clear off the items 102 from the hybrid diverter 104. The transfer bar 106 can be driven by a single motor 214 and/or a single MDR drive sprocket 438 (or gear) in each drive track 210 through a common transfer drive roller (or axle) 436.

FIGS. 8A-8H are schematic views depicting the hybrid diverter 104 in various positions during a transfer operation. These figures show operation of the hybrid diverter 104 with the transfer bar 106 operating in a compound mode. This compound mode provides a transfer motion for use with the items 102 of variations in size, position on the conveyor 100, and orientation. To prevent potential jams, missed sorts, or lost item orientation that may occur when the items 102 are out of position and/or rotated, the transfer bar 106 uses the compound motion to transfer the items 102.

In each of FIGS. 8A-8H, the hybrid diverter 104 is positioned about the conveyor 100 adjacent a first conveyor portion 100*a* and one or more second conveyor portions 100*b*, *c*. The hybrid diverter 104 may be programmed to push or steer the items 102 at settable angles of departure from the conveyor path (main conveyor flow) 108*a*. The hybrid diverter 104 may optionally employ friction, but it is not required for transfer. The hybrid diverter 104 can be programmed (e.g., using sensor S and controller 215 of FIGS. 2A-2B) to change or not change orientation of the item 102. The hybrid diverter 104 can change on-the-fly producing selectable item turning.

The hybrid diverter 104 may operate in a normal force transfer mode, with the items 102 passing along the base rollers 216 of the base frame 218 (see, e.g., FIGS. 2A-2B). The items 102 may be pushed from the conveyor path 108*a* by the transfer bar 106. The force used to move the items 102 from the conveyor path 108*a* may be mechanically applied to the side of the item 102 by the transfer bar 106.

Figure 8A:
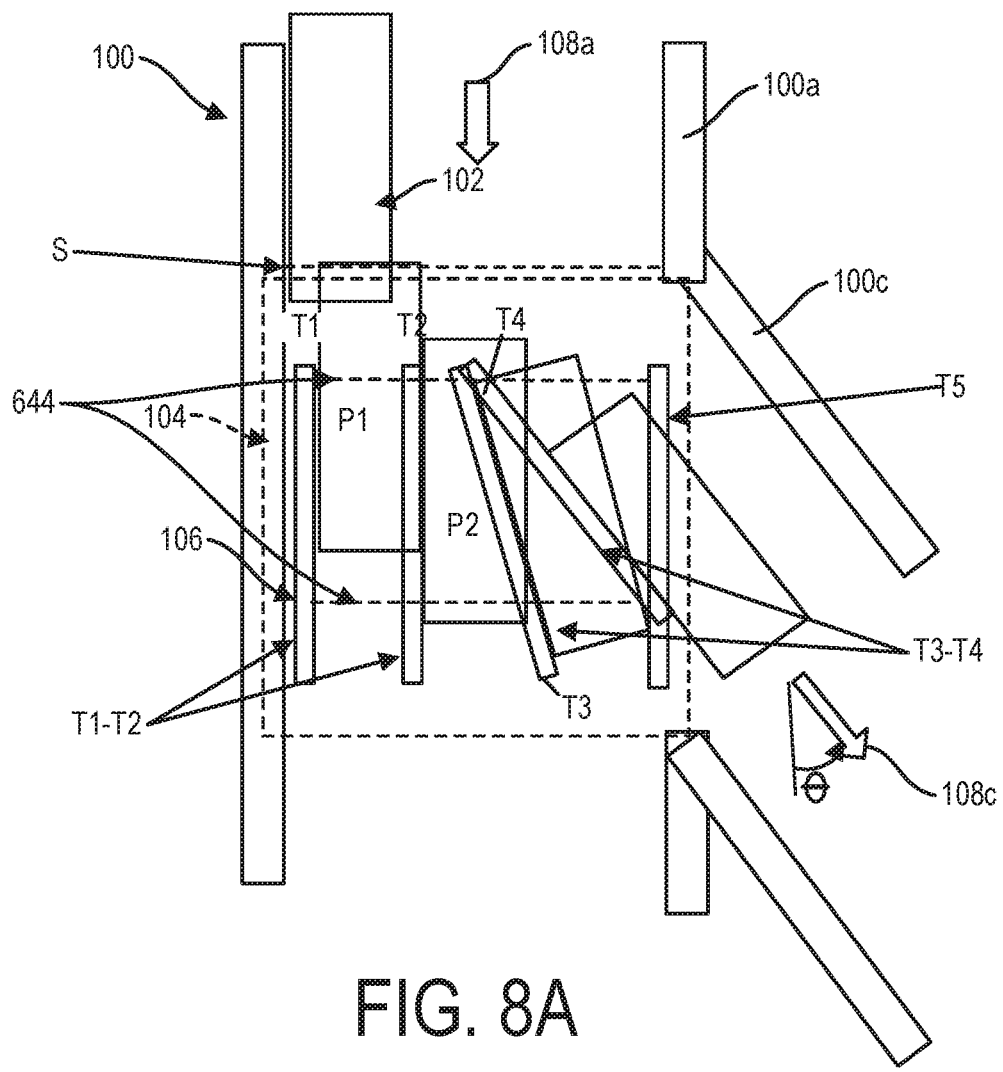
FIGS. 8A-8H show schematic views depicting the hybrid diverter in various positions during a transfer operation.
Figure 8B:
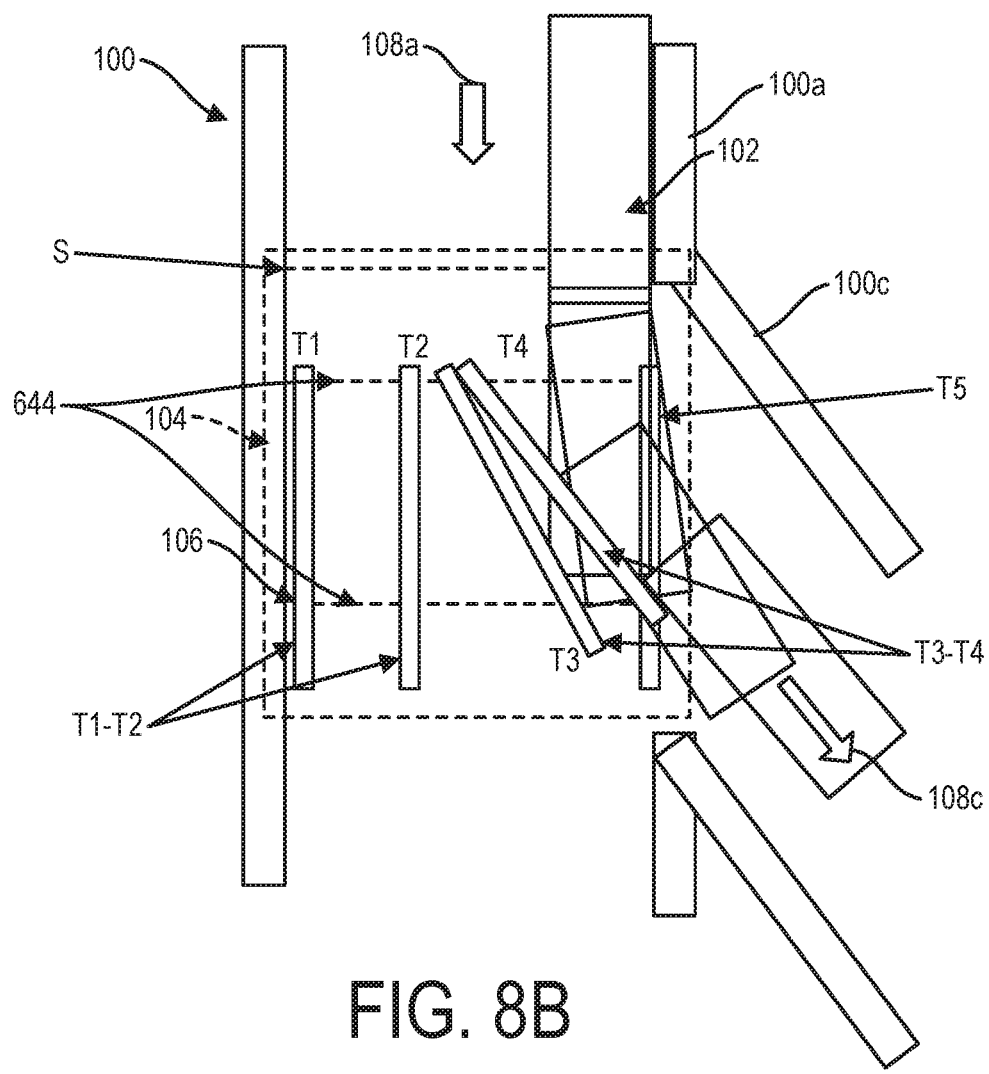

FIGS. 8A and 8B show the transfer bar 106 moving the item 102 from the main conveyor portion 100*a* to the branch portion 108*c* using a hybrid motion in a part right angle transfer and part swing arm motion. As shown by FIGS. 8A and 8B, the item 102 may be in various positions along the main conveyor portion 100*a* and the hybrid diverter 104 during operation to facilitate transfer of the items 102 even if they are in a non-ideal (bad) position.

As shown in FIG. 8A, this hybrid (compound) motion may include a primary motion to re-position far justified items 102 entering the hybrid diverter 104 from the main conveyor portion 100*a* to the branch conveyor portion 100*c* by moving the item from an initial position (zone) P1 to a secondary position (zone) P2 on the hybrid diverter 104.

The primary motion moves the transfer bar 106 from position T1 to position T2 and repositions and aligns the items 102 from the initial position P1 to the secondary (baseline) position P2 in preparation for the secondary motion. Upon entry of the item onto the hybrid diverter 104, the transfer bar 106 is advanced by the transfer drive 210 (FIG. 6) to engage the item 102 at the initial position P1 and push the item 102 to the secondary position P2.

At T1 and T2, the transfer bar 106 may be initially aligned in the direction of travel of the main conveyor portion 100*a* (i.e., along the conveyor path 108*a*) at the position T1. This primary motion brings the item 102 to a central portion of the hybrid diverter 104 at position P2. During this primary motion, the transfer bar 106 may contact the item 102 along a longitudinal side of the item 102 traversing down the conveyor 100. This contact is intended to apply a force to move the transfer bar from position the T1 to T2 and the item from position P1 to position P2 without causing unintentional turning of the item 102. (Intentional turning may be optionally provided.) With contact along at least a longitudinal portion of the item 102, the transfer bar 106 may touch the item 102 along a length of a side of the item 102. This contact may be intended to apply a force to more than a single corner which may result in damage to the corner of the item 102. Longitudinal contact may encourage the item 102 to continue its progress down the hybrid diverter 104.

The transfer bar 106 may be a longitudinal oriented pusher bar maintained in the first half of the travel from position T1 to position T2. The primary motion may be produced by running each of the first and the second independent drive tracks 644 at the same speed. After the transfer bar 106 progresses to position P2 (about the halfway point), the second independent drive tracks 644 increases speed. This process begins the secondary motion.

The secondary motion diverts the re-positioned item 102 onto the branch conveyor portion (take away conveyor) 100b at a desired angle (Θ). The transfer bar 106 is further advanced from position T2 to T3 and then from position T3 to T4 by the transfer drive 210 (FIG. 6) at the desired angle (Θ) such that the item 102 is shifted from the conveyor path 108a to the transfer path 108b. To achieve the desired angle (Θ), the drive tracks 644 may be selectively advanced to rotate the transfer bar 106 and slide the transfer bar 106 along the second slotted end 752 (FIG. 6). This motion may be manipulated to achieve the desired movement of the item 102 to the branch conveyor portion 100b.

During the secondary motion, higher speed in the second independent drive tracks 644 causes a rotation in the transfer bar 106 and subsequently in the item 102. The item 102 continues to move across the hybrid diverter 104 and simultaneously rotate. Each of the first and the second independent drive tracks 644 runs until reaching the final position T5. Upon reaching the desired rotation, the second independent drive tracks 644 reverts to its base speed (same as the speed of the first independent drive track 644), and then returns to its original (alignment) position T1. The item 102 will be carried onto the branch conveyor portion (takeaway conveyor or chute) 100b when the second independent drive tracks 644 reaches its initial position T1. The second independent drive tracks 644 reaches its initial position T1 by rotating the transfer bar 106 back to a longitudinal alignment at T5 and returning to its initial position T1 ready for the next item 106. The transfer bar's 106 contact with a trailing edge of the item 102 during re-alignment of the transfer bar 106 at position T5 helps to clear the item 102 completely from the hybrid diverter 104.

As shown in FIG. 8B, the item 102 may enter the diverter in any position. In this example, during the primary motion from position T1 to T2, the transfer bar 106 does not engage the item 102. The transfer bar 106 contacts the item at position T3 and turns the item as the transfer bar 106 continues to rotate to the position T4.

Figure 8C:
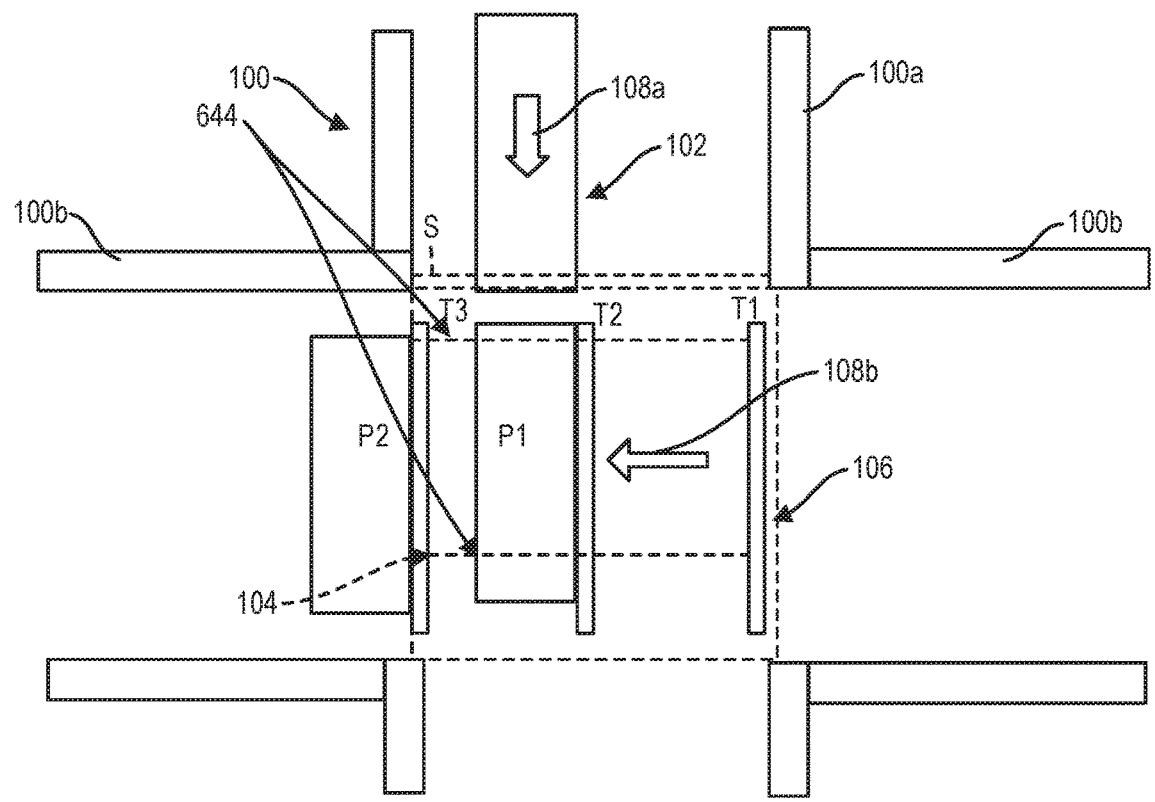
Figure 8D:
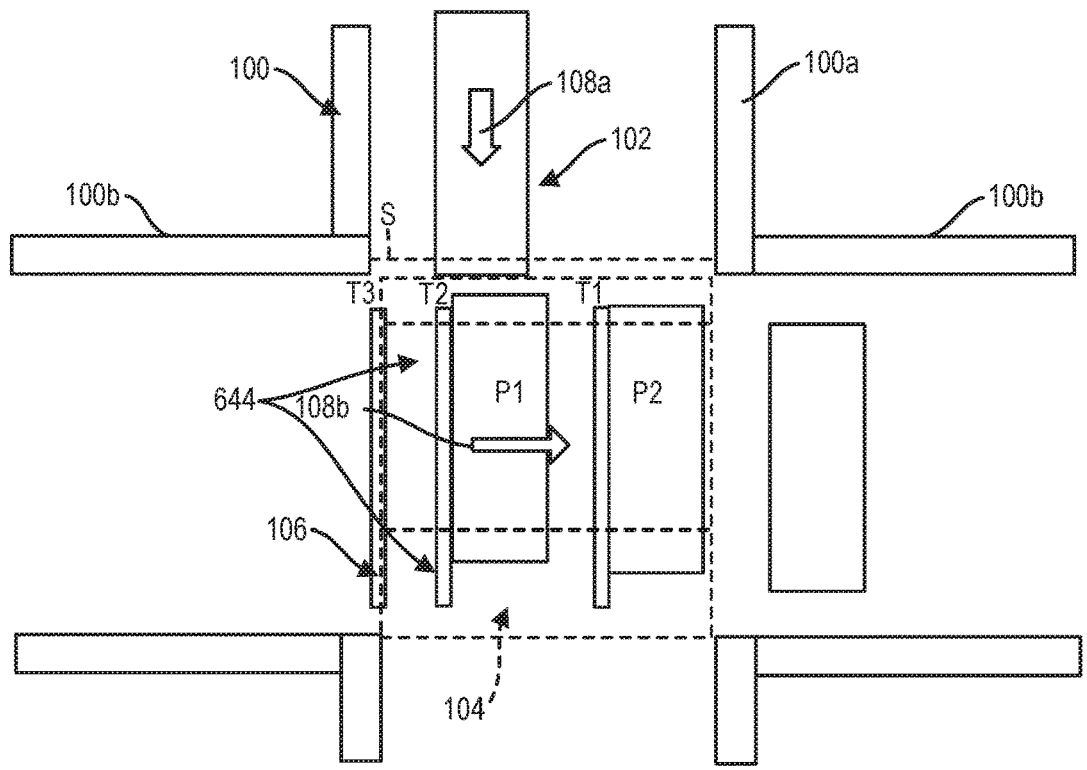

FIGS. 8C and 8D show the transfer bar 106 moving the item 102 from the main conveyor portion 100a to the branch portion 108b using a hybrid motion in a right-angle transfer motion. As shown by these figures, the hybrid diverter 104 may have bi-directional sortation capabilities. The hybrid diverter 104 can be programmed to sort to the left or right with standard right-angle motion or compound motion for diversion of flow.

The hybrid diverter 104 of FIGS. 8C and 8D is similar to that of FIGS. 8A and 8B, except that the angle is a right angle (i.e. 90-degree angle). As shown in FIG. 8C, the transfer bar 106 is advanced from position T1 along transfer path 108b to position T2 to engage the item 102 at position P1, and then to position T3 to push the item 102 to position P2. As shown in FIG. 8D, the transfer bar 106 is advanced from position T3 along transfer path 108b to position T2 to engage the item 102 at position P1, and then to position T1 to push the item 102 to position P2.

The movement of the hybrid diverter 104 in FIGS. 8C and 8D may be combined so that the hybrid diverter 104 may have programmable item orientation capabilities where one hybrid diverter 104 is bidirectional and functions as two. The items 102 may be diverted or sorted with ether of the minor or major item edges leading. This feature can change on the fly based on many criteria, such as item size or sort direction.

Figure 8F:
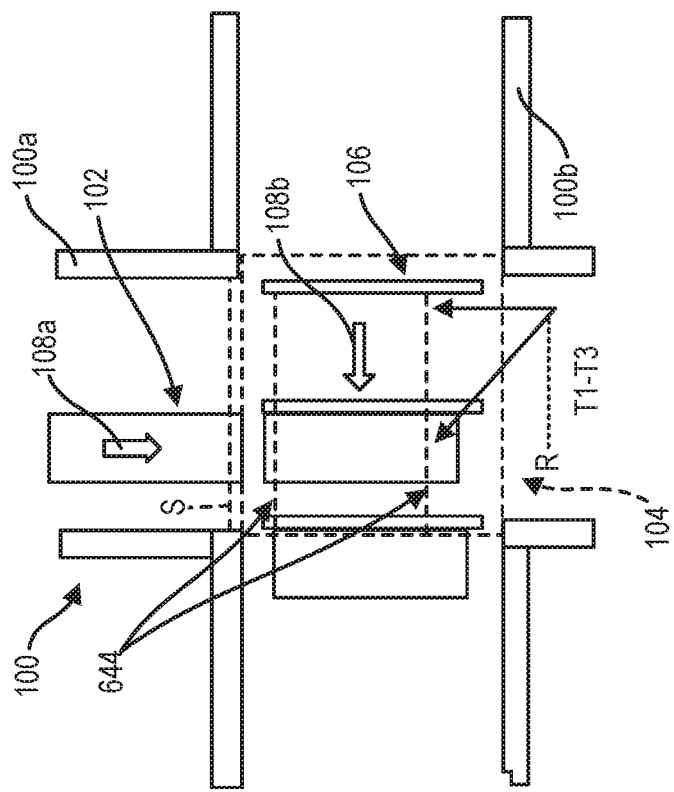
Figure 8E:
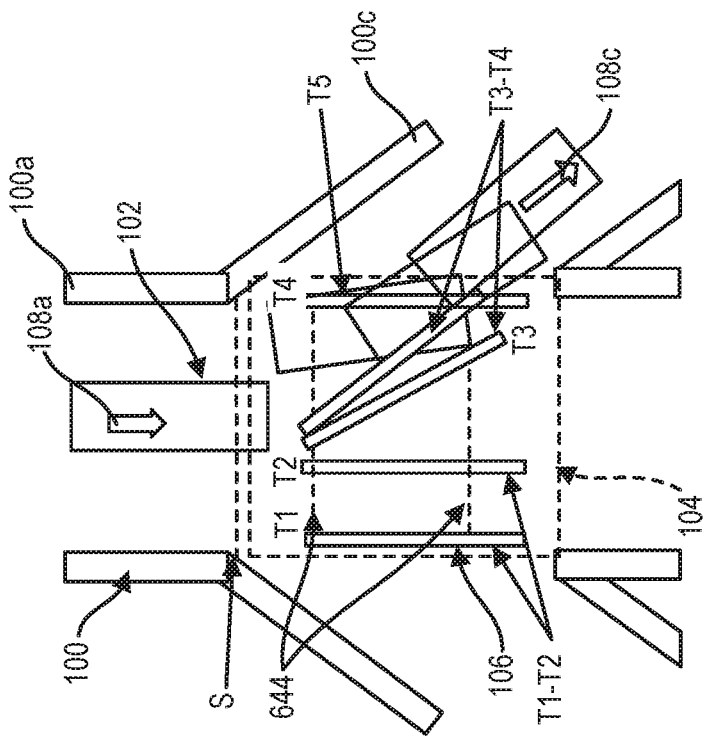

As shown in FIGS. 8E and 8F, the hybrid diverter 104 may be usable with a variety of conveyor configurations. In the example of FIG. 8E, the hybrid diverter 104 is capable of operating as described in FIG. 8A to pass the item 102 to the branch conveyor portion 100b, c on the right, and then reversing movement of the transfer bar 106 so that the item 102 is moved to the branch conveyor portion 100b, c on the left. The transfer bar 106 may be translated and rotated to provide the movement necessary to pass the items 102 to the desired branch conveyor portion 100b on the left or the right. The hybrid diverter 104 may be selectively programmed to provide selective sorting of the items 102 upon detection by the sensor S.

Similarly, as shown in FIG. 8F, the hybrid diverter 104 may be used with a right-angle conveyor configuration to pass the items back and forth between the branch conveyor portions 100b. This back and forth movement may be used, for example, in operations with accumulation and sequencing as shown in FIGS. 2A and 2B.

The hybrid diverter 104 may be used to operate in either the acute angle configuration of FIG. 8E, the right-angle configuration of FIG. 8F, or both. As previously shown in FIGS. 2A and 2B, the conveyor 100 may include branch conveyor portions 100b, c having different angles. The conveyor 100 in this example includes a hybrid diverter 104 for transferring the items 102 to both a right angle and an acute angle conveyor branch portion 100b, c. The conveyor 100 may be provided with one or more of the branch conveyor portions 100b, c, each at the same or different angles. The hybrid diverter 104 may include the same transfer bar 106 movable between various positions (e.g., T1-T5) along the selected transfer paths 108b, c for pushing the items 102 to the desired branch conveyor portion 100b, c Referring to FIGS. 8A-8H, the hybrid diverter 104 may have adjustment capabilities for handling out of position items 102 (e.g., items riding on the rails as in FIG. 8B). As shown by FIGS. 8A and 8B, the hybrid diverter 104 may be used in cases where the item 102 enters the hybrid diverter 104 from various position along the main conveyor portion 100a. In FIG. 8A, the item 102 enters from a left side of the main conveyor portion 100a and operates as described above. In FIG. 8B, the item 102 enters from a right side of the main conveyor portion 100a. In this example, the motion of the transfer bar 106 from T1 to T2 is not needed to push the item 102 into position for the secondary movement. In this example, the transfer bar 106 advances from position T1 to position T3 before engaging the item 102. Once the item 102 is engaged, the item 102 may be rotated by the secondary motion of the transfer bar 106 from position T3 to position T4 to rotate the item 102 to the desired departure angle (Θ).

Figure 8H:
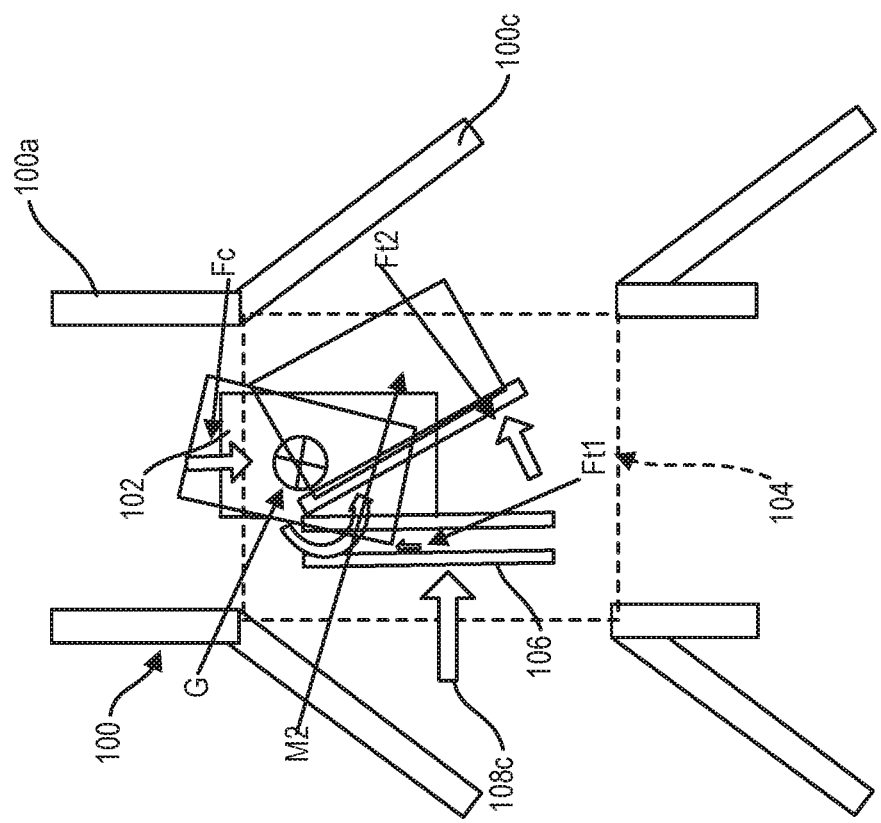
Figure 8G:
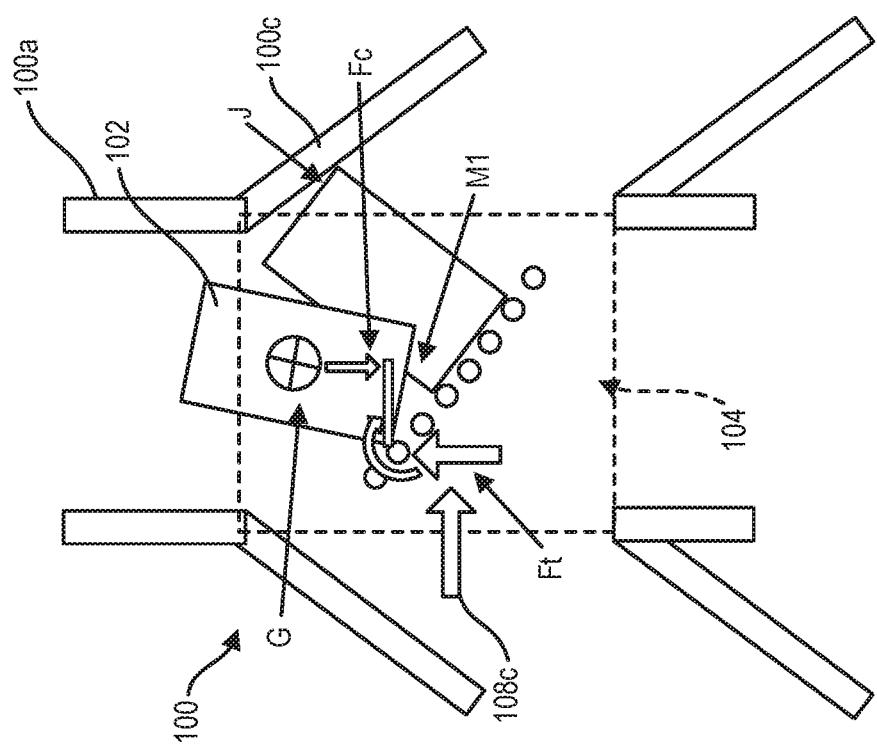

As shown in FIGS. 8G and 8H, the hybrid diverter 104 may also have adjustment capabilities for handling turned or misaligned items 102 and preventing jams. The hybrid diverter 104 be used to properly orient the items 102 for transfer, and may prevent the items 102 from rotating incorrectly. As shown in FIGS. 8G and 8H, each item 102 has a center of gravity G and is driven by the main conveyor portion 100a by a conveyor force Fc.

FIG. 8G shows a transfer operation using a one-step motion to advance the item 102 to the branch conveyor portion 100c. As shown in FIG. 8G, upon activation of the hybrid diverter 104, the transfer bar 106 moves along the transfer path 108c and applies a large vector force Ft to the item 102. As indicated by the curved arrow, a rotation moment M1 is created on the item 102 and the item 102 jams against the branch conveyor portions 100b at position J.

FIG. 8H shows a transfer operation using a 2-step motion to advance the item 102 to the branch conveyor portion 100c. As shown in FIG. 8H, upon activation of the hybrid diverter 104, the transfer bar 106 moves along the transfer path 108c and applies an initial small vector force Ft1 to shift the item 102 into position for transfer, and then another small vector force Ft2 to push the item 102 off of the hybrid diverter 104 and onto the branch conveyor portion 100c. As indicated by the curved arrow, a rotation moment M2 is created on the item 102. In this operation, the item 102 is gradually positioned and advance to prevent the jam J that occurred in the transfer operation of FIG. 8G.

Other adjustments may be made to facilitate transfer operations using the hybrid diverter 104. For example, transfer operations may be facilitated by adjusting speed of the hybrid diverter 102 relative to conveyor speed. Another adjustment may be made by moving the items 102 with the transfer bar 106 at various rates and angles. The compound hybrid motion of the hybrid diverter 104 allows a transfer mechanism surface of the transfer bar 106 to be parallel to the direction of main conveyor portion 100a when a corner of the item 102 is engaged. The resulting opposing force may be proportionally small allowing for much higher conveyor speeds and throughput.

FIG. 9 is a flow chart depicting a method 900 of diverting items 102. The method 900 may be used for diverting items about a conveyor as shown, for example in FIGS. 1A-2B and FIGS. 8A-8H. The method 900 comprises 980-providing the hybrid diverter as described herein. For example, the hybrid diverter may comprise a base and a transfer assembly. The base comprises a base frame and base rollers. The base frame is positionable about the conveyor. The base rollers are rotationally supported on the base frame to define a base path for passing the items therealong. The base path is in alignment with a conveyor path of the conveyor. The transfer assembly comprises a transfer drive supported by the base and a transfer bar. The transfer drive comprises a first independent drive track and a second independent drive track. The transfer bar has a fixed end connected to the first independent drive track and a slotted end movably connectable to the second independent drive track. The transfer bar is movable by the first independent drive track and the second independent drive track along a variable transfer path about the base. The transfer bar has a surface for engagement with the items whereby, upon activation of the first independent drive track and the second independent drive track, the transfer bar selectively diverts the items away from the conveyor path.

The method further comprises 982-passing the items along the conveyor path of the conveyor; and 984-diverting the items from the conveyor path of the conveyor by activating the transfer drive to drive the transfer bar and to push the items along the transfer path. The activating 984 may comprise 986—advancing the transfer bar by independently rotating belts of each of the first independent drive track and the second independent drive track and allowing the second movable end of the transfer bar to slide about the second independent drive track. The diverting may comprise 988—advancing and rotating the transfer bar, or 989—advancing the transfer bar to a first position and then advancing the transfer bar to a second position while rotating the transfer bar.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features and/or methods provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. For example, while certain conveyors and hybrid diverters are provided herein, it will be appreciated that various forms of one or more conveyors (or conveyor portions) with one or more hybrid or other diverters may be provided. Additionally, various combinations of one or more of the features of the hybrid diverter may be used. While the figures herein depict a specific configuration or orientation, these may vary. First and second are not intended to limit the number or order.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

What is claimed is:

1. A hybrid diverter for a conveyor, the conveyor defining a conveyor path between locations for transporting items therebetween, the hybrid diverter comprising:
   a base comprising a base frame and base rollers, the base frame positionable about the conveyor, the base rollers rotationally supported on the base frame to define a base path for passing the items therealong, the base path in alignment with the conveyor path of the conveyor; and
   a transfer assembly, comprising:
      a transfer drive supported by the base, the transfer drive comprising a first independent drive track and a second independent drive track; and
      a transfer bar having a fixed end connected to the first independent drive track and a slotted end movably connectable to the second independent drive track, the transfer bar movable by the first independent drive track and the second independent drive track along a variable transfer path about the base, the transfer bar having a surface for engagement with the items whereby, upon activation of the first independent drive track and the second independent drive track, the transfer bar selectively diverts the items away from the conveyor path.

2. The hybrid diverter of claim 1, wherein the base frame comprises a plurality of frame rails and a plurality of conversion plates.

3. The hybrid diverter of claim 1, wherein the transfer drive further comprises at least one motor to drive the first independent drive track and the second independent drive track.

4. The hybrid diverter of claim 1, further comprising a sensor positioned about the transfer assembly to detect the items.

5. The hybrid diverter of claim 1, wherein the first independent drive track and the second independent drive track each comprise sprockets and a belt, the sprockets coupled to portions of the base frame with the belt encircling the sprockets.

6. The hybrid diverter of claim 5, wherein the transfer assembly further comprises bar connectors, the first independent drive track and the second independent drive track each coupled to the belt by a respective one of the bar connectors.

7. The hybrid diverter of claim 6, wherein the bar connectors each comprise a bar pin and a belt sleeve, the bar pin connectable to the transfer bar, the belt sleeve connectable to the bar pin and slidably connectable to the belt.

8. The hybrid diverter of claim 7, wherein the bar connectors each further comprise an anti-rotation key.

9. The hybrid diverter of claim 1, wherein the transfer bar comprises an elongate member with a plurality of bar rollers along the surface of the transfer bar.

10. The hybrid diverter of claim 1, wherein the base rollers are rotationally interconnected connected about the base frame by o-bands.

11. The hybrid diverter of claim 1, wherein the base rollers are aligned linearly along the base frame with spaces therebetween, each of the first independent drive track and the second independent drive track being positioned in a respective one of the spaces.

12. The hybrid diverter of claim 1, wherein the variable transfer path is at an acute angle or a right angle to the conveyor path.

13. The hybrid diverter of claim 1, wherein the variable transfer path is linear or non-linear.

14. A conveyor system for transporting items between locations, the conveyor system comprising:

a conveyor comprising a conveyor frame with conveyor rollers thereon defining a conveyor path between the locations; and
a hybrid diverter, comprising:
a base comprising a base frame and base rollers, the base frame positionable about the conveyor, the base rollers rotationally supported on the base frame to define a base path for passing the items therealong, the base path in alignment with the conveyor path of the conveyor; and
a transfer assembly, comprising:
a transfer drive supported by the base, the transfer drive comprising a first independent drive track and a second independent drive track; and
a transfer bar having a fixed end connected to the first independent drive track and a slotted end movably connectable to the second independent drive track, the transfer bar movable by the first independent drive track and the second independent drive track along a variable transfer path about the base, the transfer bar having a surface for engagement with the items whereby, upon activation of the first independent drive track and the second independent drive track, the transfer bar selectively diverts the items away from the conveyor path.

15. The conveyor system of claim 14, wherein the conveyor comprises a plurality of conveyor portions and the hybrid diverter is positioned between a pair of the plurality of conveyor portions.

16. The conveyor system of claim 15, wherein the plurality of conveyor portions comprises a main conveyor portion and a plurality of branch conveyor portions.

17. A method of diverting items about a conveyor, the method comprising:

providing the hybrid diverter as in claim 1;
passing the items along the conveyor path of the conveyor; and
diverting the items from the conveyor path of the conveyor by activating the transfer drive of the hybrid diverter to drive the transfer bar and to push the items along the variable transfer path.

18. The method of claim 17, wherein the activating comprises advancing the transfer bar by independently rotating belts of each of the first independent drive track and the second independent drive track and allowing the slotted end of the transfer bar to slide about the second independent drive track.

19. The method of claim 17, wherein the diverting comprises advancing and rotating the transfer bar.

20. The method of claim 17, wherein the diverting comprises advancing the transfer bar to a first position, and then advancing the transfer bar to a second position while rotating the transfer bar.

* * * * *